(12) United States Patent  
Adrain

(10) Patent No.: US 10,232,790 B1
(45) Date of Patent: Mar. 19, 2019

(54) SECURE STORAGE DEVICE

(71) Applicant: John B. Adrain, Frisco, TX (US)

(72) Inventor: John B. Adrain, Frisco, TX (US)

(*) Notice: Subject to any disclaimer, the term of this patent is extended or adjusted under 35 U.S.C. 154(b) by 0 days.

(21) Appl. No.: 16/031,853

(22) Filed: Jul. 10, 2018

Related U.S. Application Data

(63) Continuation-in-part of application No. 14/299,167, filed on Jun. 9, 2014, which is a continuation-in-part of application No. 14/212,858, filed on Mar. 14, 2014, now abandoned.

(60) Provisional application No. 61/782,761, filed on Mar. 14, 2013, provisional application No. 62/531,540, filed on Jul. 12, 2017.

(51) Int. Cl.
| | |
|---|---|
| *B60R 7/05* | (2006.01) |
| *B60R 7/14* | (2006.01) |
| *B60J 3/02* | (2006.01) |
| *F41H 5/18* | (2006.01) |
| *F41C 33/06* | (2006.01) |
| *E05G 1/00* | (2006.01) |
| *B60R 7/04* | (2006.01) |
| *B60R 11/00* | (2006.01) |

(52) U.S. Cl.
CPC ............... *B60R 7/14* (2013.01); *B60R 7/05* (2013.01); *E05G 1/00* (2013.01); *B60J 3/02* (2013.01); *B60R 7/043* (2013.01); *B60R 2011/0035* (2013.01); *E05G 1/005* (2013.01); *F41C 33/06* (2013.01); *F41H 5/18* (2013.01)

(58) Field of Classification Search
CPC ....... B60R 7/05; B60R 7/14; B60R 2011/035; F41H 5/06; F41H 5/13; F41H 5/26; F41H 5/18; B60J 3/02

USPC ............... 224/312; D12/417; 296/97.4, 97.8
See application file for complete search history.

(56) References Cited

U.S. PATENT DOCUMENTS

| | | | | |
|---|---|---|---|---|
| 1,358,262 | A * | 11/1920 | Sumner | B60J 3/002 296/95.1 |
| 1,632,360 | A * | 6/1927 | Wilson | B60P 3/03 105/394 |
| 1,791,701 | A * | 2/1931 | Beal | F41H 5/26 109/23 |
| 1,990,413 | A | 3/1934 | Michaelis | |
| 2,148,557 | A | 5/1937 | Hook | |
| 2,100,427 | A | 11/1937 | Blocker | |
| 3,464,606 | A * | 9/1969 | Nordeen | A47B 81/005 224/281 |
| 4,075,468 | A * | 2/1978 | Marcus | B60J 3/0282 296/97.5 |
| 4,256,245 | A * | 3/1981 | Serres | F41A 17/02 220/481 |
| 4,275,916 | A | 6/1981 | Skogler | |
| 4,280,730 | A | 7/1981 | Turner | |
| 4,309,065 | A * | 1/1982 | Pappas | A47B 81/005 224/912 |
| 4,521,051 | A | 6/1985 | Cody | |

(Continued)

*Primary Examiner* — Justin Larson
(74) *Attorney, Agent, or Firm* — Bodi Law LLC; Robert F. Bodi

(57) ABSTRACT

A secure storage device is presented. The secure storage device comprises walls, a bottom, a door and an opening for forming an interior chamber for storage. The device may be constructed of a variety of materials, including but not limited to aluminum, steel, impact-resistant materials, and bullet-proof materials. It at least one embodiment, the secure storage device is configured to act as a sun visor for a vehicle for securely storing a weapon.

23 Claims, 23 Drawing Sheets

(56) References Cited

U.S. PATENT DOCUMENTS

| | | | |
|---|---|---|---|
| 4,984,725 A | 1/1991 | Urbom | |
| 5,004,138 A * | 4/1991 | Gabas | A61L 9/12 |
| | | | 224/312 |
| 5,031,952 A | 7/1991 | Myamoto | |
| 5,307,725 A * | 5/1994 | Desmond | F41H 5/263 |
| | | | 296/152 |
| 5,364,153 A | 11/1994 | Vaxelaire | |
| 5,409,284 A | 4/1995 | Mahler | |
| 5,470,122 A | 11/1995 | Feng | |
| 5,487,323 A * | 1/1996 | Madden, Jr. | F41H 5/263 |
| | | | 296/84.1 |
| 5,503,316 A * | 4/1996 | Stewart | B60R 7/05 |
| | | | 224/312 |
| 5,511,711 A * | 4/1996 | Kunz | B60R 7/14 |
| | | | 224/539 |
| 5,749,507 A * | 5/1998 | Wood | F41A 23/18 |
| | | | 224/255 |
| 6,082,272 A | 7/2000 | Adrain | |
| 6,347,824 B1 | 2/2002 | Akouri | |
| 6,557,812 B2 | 5/2003 | Kutzehr | |
| 6,647,857 B1 | 11/2003 | Newkirk | |
| 7,143,913 B2 * | 12/2006 | Lindsey | B62J 11/00 |
| | | | 224/413 |
| 7,347,480 B2 | 3/2008 | Lee | |
| 7,401,838 B2 | 7/2008 | Morris | |
| 7,810,422 B2 * | 10/2010 | David | F41H 5/013 |
| | | | 89/36.01 |
| 7,832,325 B1 * | 11/2010 | Hamann | F41H 5/013 |
| | | | 89/36.01 |
| 7,854,464 B2 | 12/2010 | Mori | |
| 7,942,092 B1 * | 5/2011 | Kiel | F41H 5/16 |
| | | | 89/36.08 |
| 8,083,113 B2 * | 12/2011 | Klosk | B60R 7/087 |
| | | | 224/539 |
| 8,087,341 B2 * | 1/2012 | Adler | F41H 5/013 |
| | | | 89/36.08 |
| 8,500,186 B2 | 8/2013 | Warren | |
| 8,826,704 B1 * | 9/2014 | Marshall | E05G 1/10 |
| | | | 109/50 |
| 8,931,422 B2 * | 1/2015 | Heim | F41C 33/06 |
| | | | 109/45 |
| 2003/0192581 A1 * | 10/2003 | Chang | B60J 5/0494 |
| | | | 135/88.07 |
| 2006/0243126 A1 * | 11/2006 | Tyler | F41H 1/00 |
| | | | 89/36.01 |
| 2012/0146357 A1 | 6/2012 | Huang | |
| 2015/0356959 A1 * | 12/2015 | Tassell | G10G 7/005 |
| | | | 206/314 |

\* cited by examiner

SECURE STORAGE DEVICE

CROSS-REFERENCE TO RELATED APPLICATIONS

This application is a continuation in part of U.S. patent application Ser. No. 14/299,167 filed on Jun. 9, 2014, which is a continuation-in-part of U.S. Utility application Ser. No. 14/212,858, filed Mar. 14, 2014, which claims the benefit of U.S. Provisional Application No. 61/782,761, filed Mar. 14, 2013, the entire disclosures of which are incorporated herein by reference. This application also claims the benefit of U.S. Provisional Patent Application No. 62/531,540 filed on Jul. 12, 2017, and incorporated herein by reference.

BACKGROUND

Certain valuables or devices need to be protected from access by unauthorized personnel. Examples of such valuables include, but are not limited to, firearms, jewelry, knives, weapons, electronics, money, personal documents, and emergency food rations. Traditional safes do not allow for valuables to be placed in readily accessible areas. A secure storage device that is accessible, uses space efficiently, and is relatively simple to install and move is desirable.

BRIEF SUMMARY

Disclosed is a secure storage device for protecting valuables or weapons, the device comprising an enclosure defined by side walls, a bottom, and an opening. The opening of the enclosure may be secured by a mechanism to prevent unauthorized access. In a further embodiment, the device may be constructed from an impact-resistant material. In a further embodiment, the device may be constructed from bullet-proof material. In a further embodiment of the invention, the secure storage device may be covered with a bullet-proof material, including but not limited to Kevlar.

Further provided is a secure storage device that is a visor for a vehicle comprising an enclosure defined by walls, a bottom, and a door configured to open and close to access an interior chamber; an attachment mechanism configured to install the enclosure in a vehicle; and weapon mounting hardware configured to secure a weapon in the interior chamber; wherein said attachment mechanism is adapted to allow rotation of said enclosure about an axis to expose and partially block a window of the vehicle.

Also provided is a secure storage device that is a visor for a vehicle comprising: an enclosure defined by walls, a bottom, and a door configured to open and close to access an interior chamber; an attachment mechanism configured to connect the enclosure to a roof of a vehicle at two different points; and weapon mounting hardware configured to secure a weapon in the interior chamber; wherein said attachment mechanism is adapted to allow rotation of said enclosure about an axis to expose and partially block a window of the vehicle, said attachment mechanism configured to be manually operated to lock the enclosure at a desired angular position and to release the enclosure for moving the enclosure to a different angular position at which it can be locked by the attachment mechanism.

Further provided is a method of installing a secure storage device that is a visor for a vehicle, the method comprising the steps of:
providing an after-market visor for a vehicle, said visor comprising: an enclosure defined by walls, a bottom, and a door configured to open and close to access an interior chamber, an attachment mechanism configured to install the enclosure in a vehicle, and weapon mounting hardware configured to secure a weapon in the interior chamber, wherein said attachment mechanism is adapted to allow rotation of said enclosure about an axis to expose and partially block a window of the vehicle and to lock the enclosure at a desired angle of rotation;
removing an original visor from the vehicle;
securing a first roof anchor to a roof of the vehicle at a first location;
securing a second roof anchor to the roof of the vehicle at a second point;
connecting a first part of the attachment mechanism to said first roof anchor; and
connecting a second part of the attachment mechanism to said second roof anchor.

In a further example embodiment, the secure storage device may be comprised of bullet-proof material and may include the weapon.

BRIEF DESCRIPTION OF THE DRAWINGS

The foregoing and other aspects of the invention will become apparent to those skilled in the art to which the invention relates upon reading the following description with reference to the accompanying drawings, in which.

DETAILED DESCRIPTION OF EXAMPLE EMBODIMENTS

Figure 1:
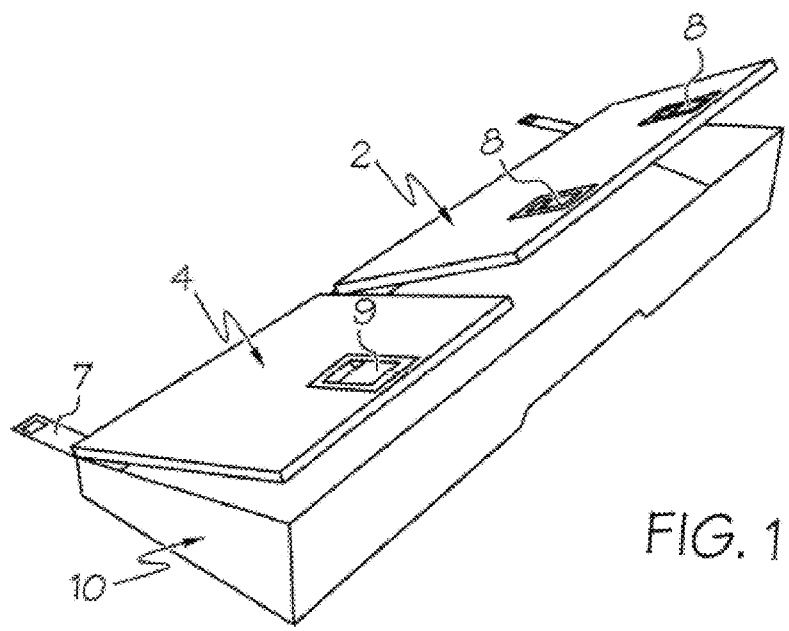
FIG. 1 is a perspective view of an enclosure of an example embodiment of the secure storage device, with the enclosure doors ajar.

Example embodiments that incorporate one or more features are described and illustrated in the drawings. These illustrated examples are not intended to be a limitation on the invention. For example, one or more aspects of the invention can be utilized in other embodiments and even other types of devices. Moreover, certain terminology is used herein for convenience only and is not to be taken as a limitation on the embodiments.

These example embodiments can be used to protect valuables from unauthorized access. Examples of such valuables include, but are not limited to, firearms, jewelry, electronics, money, personal documents, and emergency food rations. The secure storage device typically includes four walls, a bottom, and an opening. The storage device may be rectangular in shape, or some other shape which may or may not include curved portions. The opening may be pivotally attached or attached by a sliding mechanism. The door panel for the opening of the enclosure may open in any direction. The secure storage device of the examples may be installed and used in a variety of readily accessible areas. Examples of such readily accessible areas include, but are not limited to, the interior of vehicles, the console of a vehicle, the tailgate of a vehicle, and within furniture. The secure storage device of the examples may be constructed from a variety of materials. Examples of such materials include, but are not limited to, aluminum, steel, impact-resistant materials, and bullet-proof materials. In a further example embodiment, the secure storage device may be covered with a bullet-proof material, including but not limited to Kevlar, or may utilize an Acrylmide gel or ceramic or Acrylmide balls or beads, or a DuPont™ Tensylon® panel or wall. In a further example embodiment, the secure storage may be monitored and secured by a locking mechanisms that prevent unauthorized access, such as, for example, but not limited to, biometric recognition, electronic security measures, and Bluetooth technology. In a further example embodiment, the secure storage may provide access to the interior of the secure storage within seconds by use of opening mechanisms, such as, for example, but not limited to, biometric recognition and Bluetooth connection. In a further example embodiment, the secure storage may include an opening mechanism which includes, but is not limited to such mechanisms as, hydraulic, pneumatic or electrical wired to the locks of a vehicle. The storage device may be retrofitted to replace or fit within readily accessible areas that include, but are not limited to, the interior of vehicles, the console of a vehicle, the tailgate of a vehicle, and within furniture.

Figure 2:
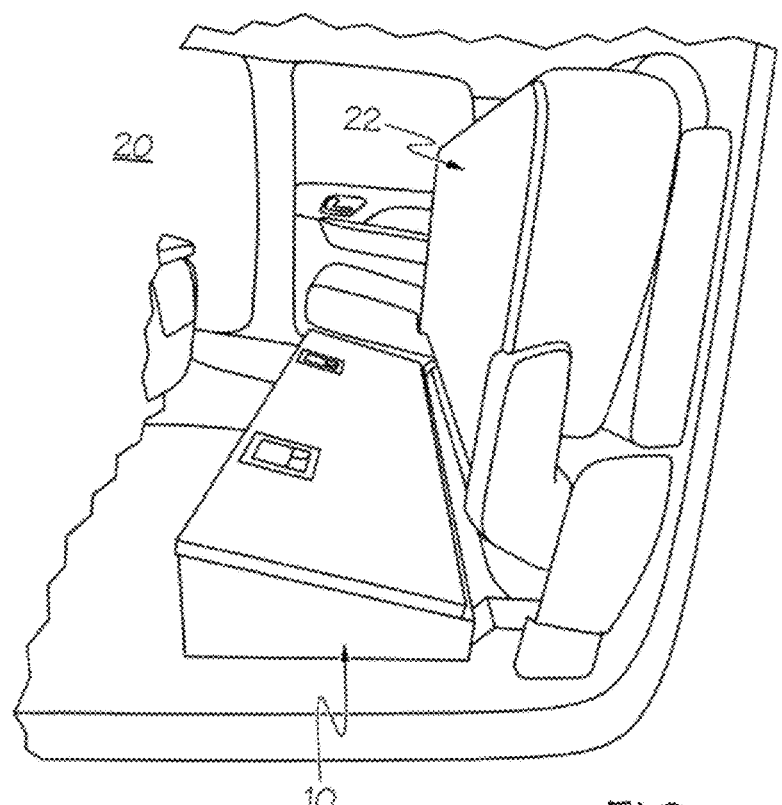
FIG. 2 is a side-perspective view of the enclosure of an example embodiment of the secure storage device, with the device placed under the seats of a vehicle
Figure 3:
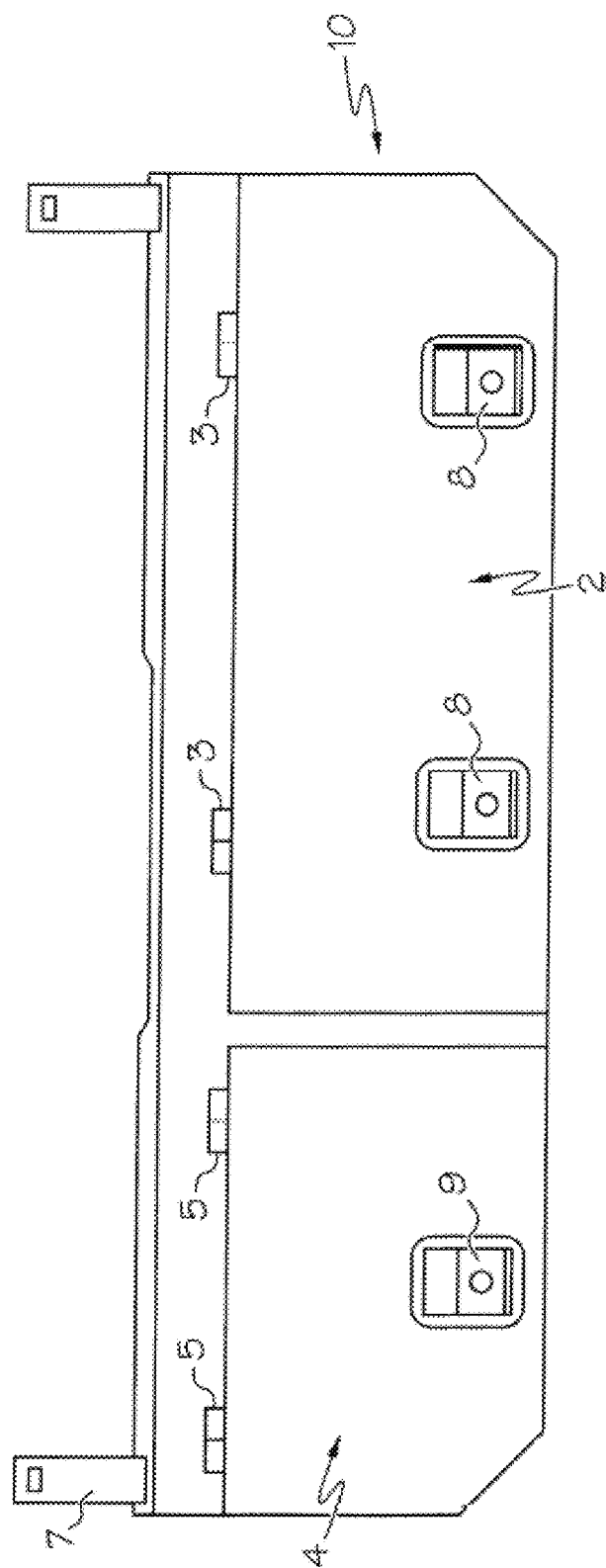
FIG. 3 is a top view of the enclosure of an example embodiment of the secure storage device.

FIGS. 1-3 show one example embodiment of such a storage device. This embodiment can include four walls, a bottom, and an opening that is split into two sections. The secure storage device 10 can be constructed from a variety of materials, including but not limited to aluminum, steel, impact-resistant materials, and bullet-proof materials. In a further example embodiment, the secure storage device 10 may be covered with a bullet-proof material, including but not limited to Kevlar. In particular, the use of DuPont™ Tensylon® for the walls of the storage device can provide a bullet-proof feature. A further example embodiment comprises racks and compartments located inside the enclosure to hold valuables, including but are not limited to, firearms, jewelry, electronics, money, personal documents, and emergency food rations. In another embodiment, each compartment may have a separate opening panel 2 and 4 pivotally attached by the same or different hinges 3 and 5 and may be locked by the same or different locking mechanisms 8 and 9. The secure storage device 10 can be placed inside the cab of a truck 20 and fastened by the attachment portion 7 under the seat 22 using existing bolts and fasteners of inside the cab of the truck 20. An example of such a unit is the TruckBunker, which is placed inside the cab of a truck and fastens to the existing seat belt tie downs. One example of such an embodiment has a total width of 56 inches and a height of 7.4 inches.

Figure 4:
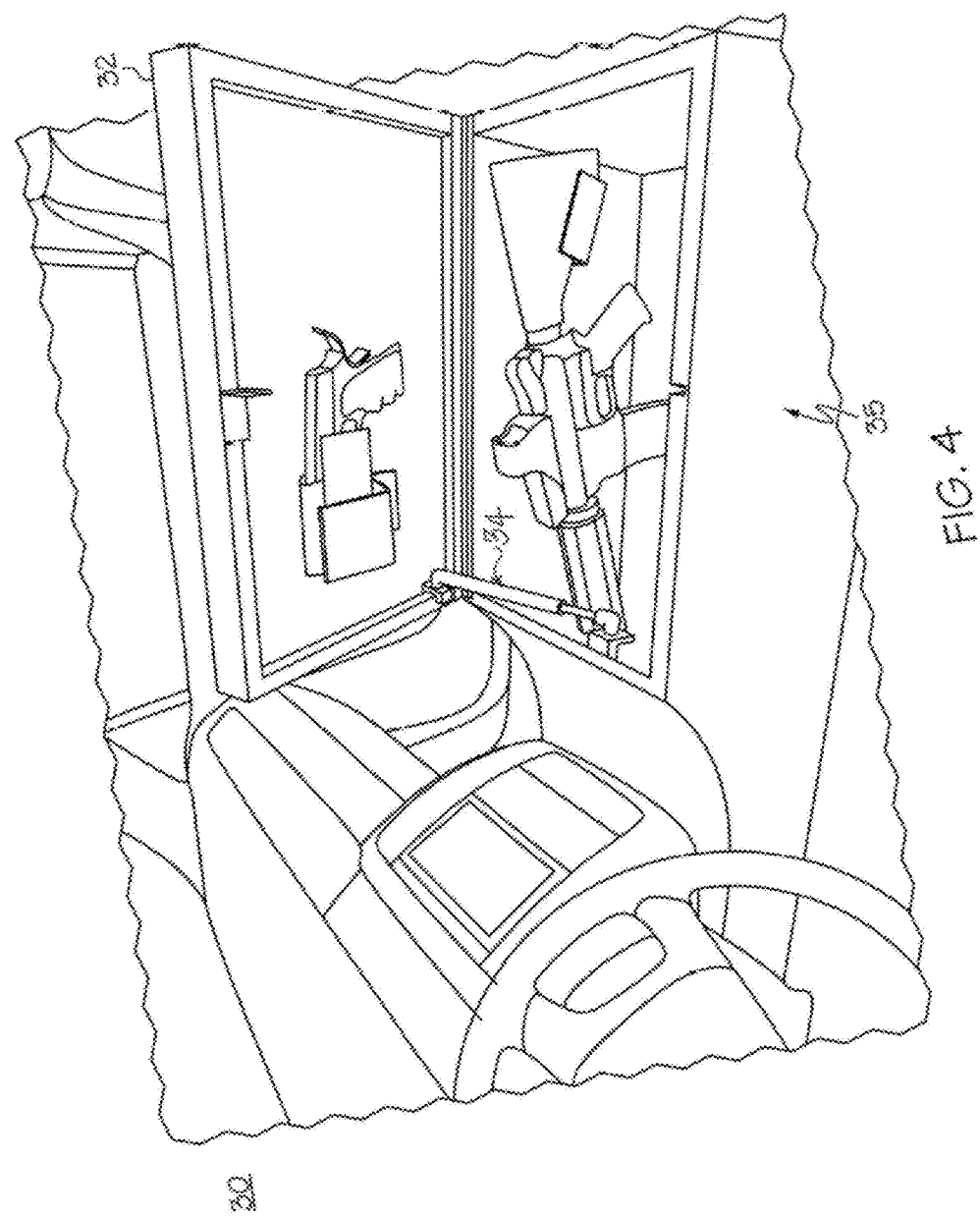
FIG. 4 is a perspective view of an enclosure of an example embodiment of the secure storage device, with the enclosure placed in the console of a vehicle and the opening ajar
Figure 5:
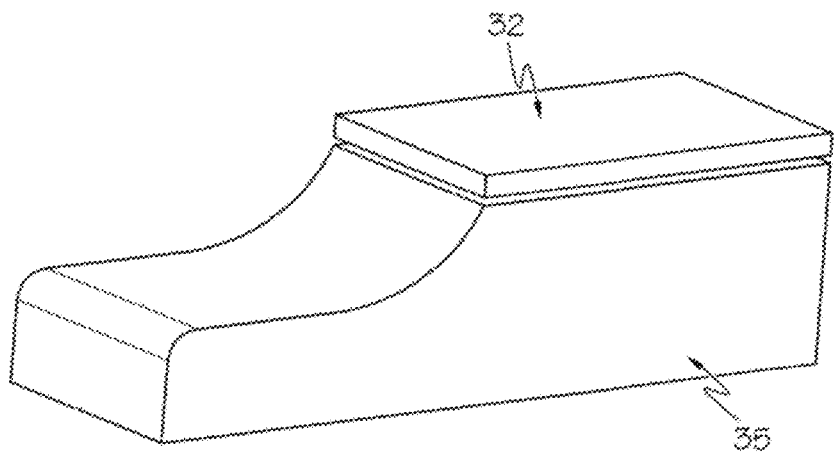
FIG. 5 is a perspective view of the enclosure of an example embodiment of the storage device that may be placed within the console of a vehicle.
Figure 6:
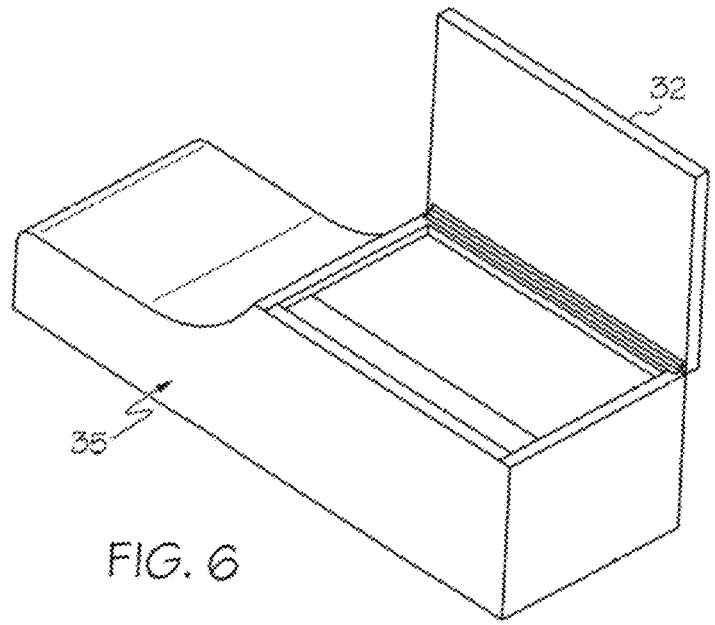
FIG. 6 is a perspective view of the enclosure of an example embodiment of the storage device that may be placed within the console of a vehicle and the opening ajar.

FIGS. 4-6 show another possible example embodiment. This embodiment can include walls, a bottom, and an opening. The secure storage device 35 can be constructed from a variety of materials, including but not limited to aluminum and bullet-proof materials. In a further example embodiment, the secure storage device 35 may be covered with a bullet-proof material, including but not limited to Kevlar. In a further example embodiment, the secure storage device 35 has a lid 32 with a non-slip surface. A further example embodiment comprises racks and compartments located inside the enclosure to hold valuables, including but are not limited to, firearms, jewelry, electronics, money, personal documents, and emergency food rations. The secure storage device 35 can replace or be placed within the console of a vehicle 30. An example of such a unit is the ConsoleBunker, which is placed in the console of a vehicle and is tied into your factory door locks and has a timing mechanism that prevents unauthorized access. One example of such an embodiment measures 43 inches long, 14 inches wide, and 13 inches tall.

Figure 18:
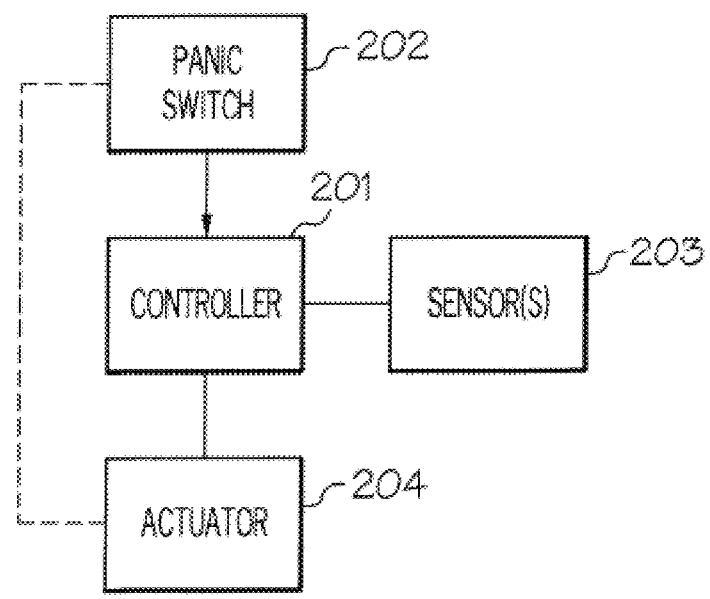
FIG. 18 is a schematic of an exemplary embodiment of a control system for the secure storage device.

An actuator 34 is shown in FIG. 4 that can be used to automatically open the lid 32 upon the occurrence of some event. This actuator can be a pneumatic or hydraulic device, an electrical solenoid, or use an electric motor. FIG. 18 is a block diagram showing a control system that could be used for engaging the actuator. This system includes a controller 201 (that could be an after-market controller utilizing a programmable processor, or an existing vehicle controller modified to include customized code). The controller 201 monitors a set of sensors 203 and/or a panic switch 202. Upon activation of the panic switch 202, and/or upon detection of certain physical conditions by the sensors 203, the controller can actuate the actuator 204 to open the lid of the storage device.

Figure 7:
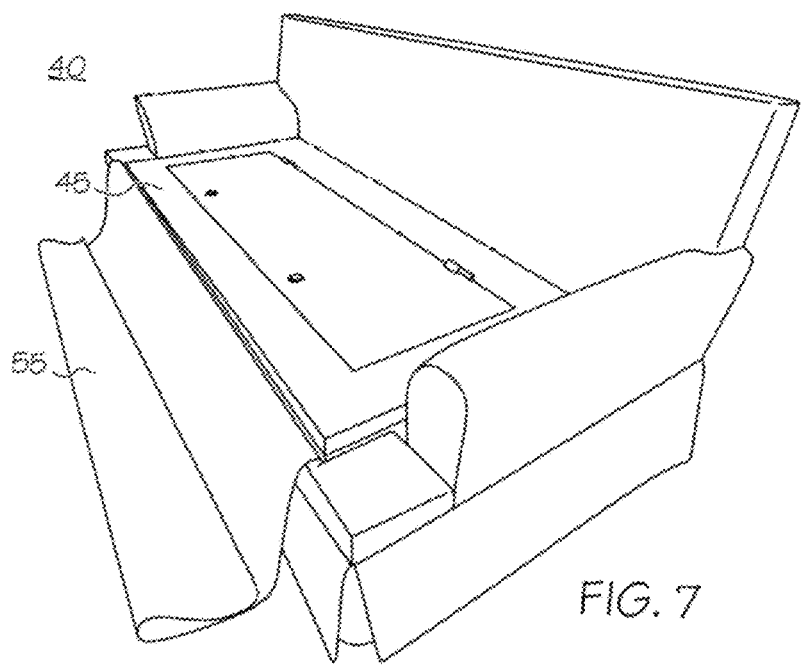
FIG. 7 is a perspective view of an enclosure of an example embodiment of the secure storage device, with the device located within a couch and the opening closed.
Figure 8:
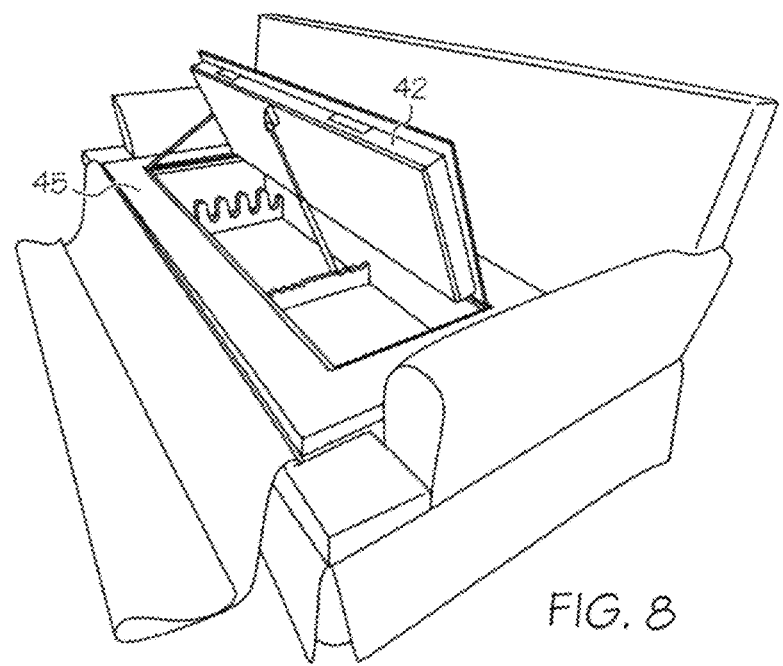
FIG. 8 is a perspective view of an enclosure of an example embodiment of the secure storage device, with the device located within a couch and the opening ajar.

FIGS. 7-8 show another example embodiment of a storage device. This embodiment can include four walls, a bottom, and an opening. The secure storage device 45 can be constructed from a variety of materials, including but not limited to aluminum, steel, impact-resistant materials, and bullet-proof materials. In a further example embodiment, the secure storage device 45 may be covered with a bullet-proof material, including but not limited to Kevlar. A further example embodiment comprises cushions and couch covering 55 constructed from a bullet-proof material, including but not limited to Kevlar or DuPont™ Tensylon®. A further example embodiment comprises cushions with a strap running along the back of the cushion to allow the cushion to be held as a shield. Such a cushion will include a bullet-proof material in the cushion that may include Lexan or DuPont™ Tensylon® or Kevlar, for example A further example embodiment comprises an opening panel 42, racks and compartments located inside the enclosure to hold valuables, including but are not limited to, firearms, jewelry, electronics, money, personal documents, and emergency food rations. The secure storage device 45 can be within a couch 40, for example. An example of such a unit is the CouchBunker, which houses a secure storage device inside of a couch. One example of such an embodiment has a safe portion that measures 78 inches long, 29.5 inches wide, and 14 inches deep. A further example embodiment comprises a secure storage device with a 2-hour fire wall.

Figure 9:
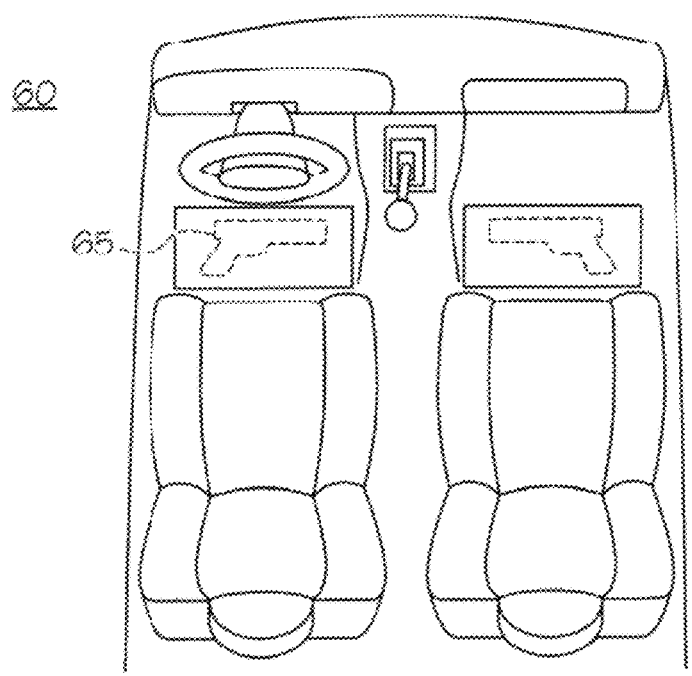
FIG. 9 is a top-perspective view of an enclosure of an example embodiment of the secure storage device, with the device located underneath the seat of a vehicle.
Figure 10:
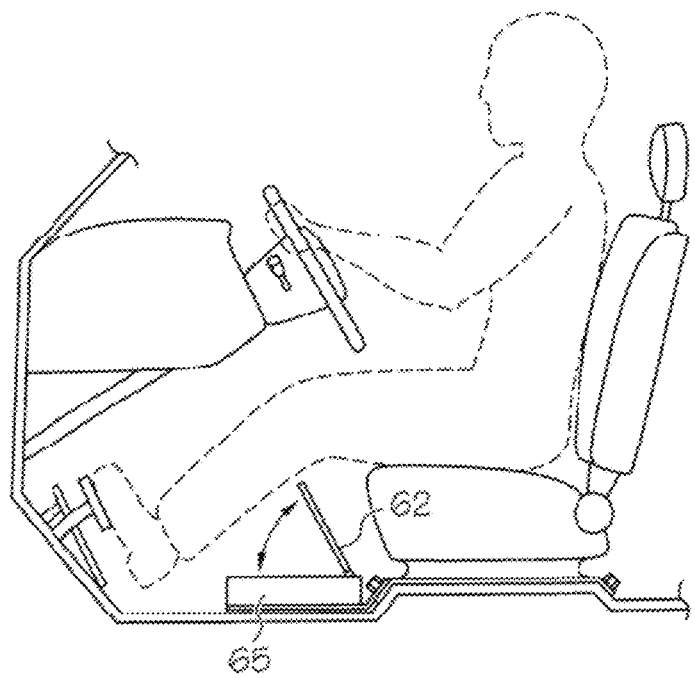
FIG. 10 is a side view of an enclosure of an example embodiment of the secure storage device, with the device located underneath the seat of a vehicle and the opening ajar.
Figure 11:
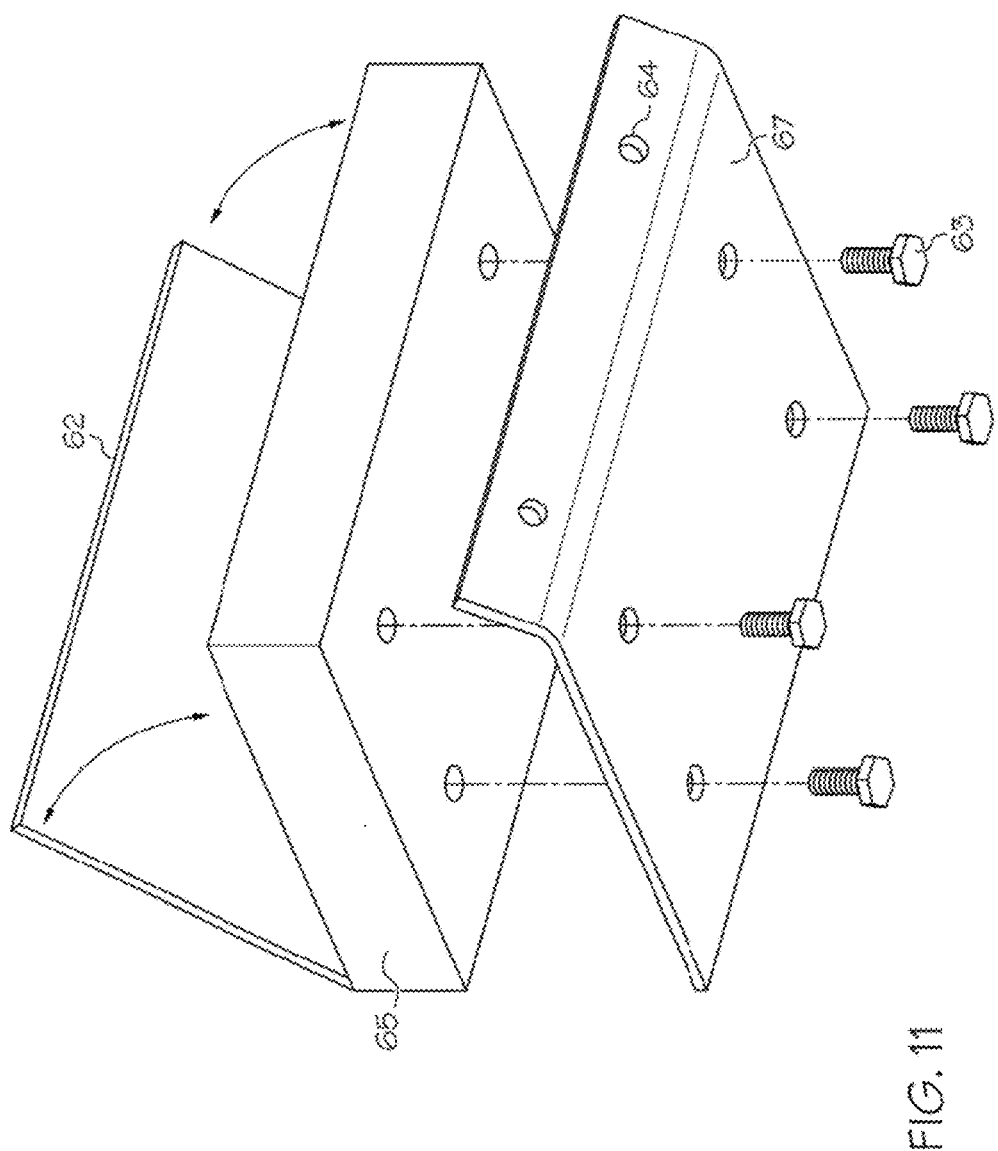
FIG. 11 is a perspective view of an enclosure of example another example embodiment of the secure storage device that may be placed underneath the seat of a vehicle, with the enclosure doors ajar and the attachment mechanism.

FIGS. 9-11 show another example embodiment. This embodiment can include four walls, a bottom, and an opening. The secure storage device 65 can be constructed from a variety of materials, including but not limited to aluminum, steel, impact-resistant materials, and bullet-proof materials such as Kevlar or Lexan or DuPont™ Tensylon®. In a further example embodiment, the secure storage device may be covered with a bullet-proof material, including but not limited to Kevlar or Lexan or DuPont™ Tensylon®. A further example embodiment comprises racks and compartments located inside the enclosure to hold valuables, including but are not limited to, firearms, jewelry, electronics, money, personal documents, and emergency food rations. The secure storage device 65 can be affixed to the floorboard of a vehicle 60 and mounted using an attachment panel 67 that may be customized for the particular operation (e.g., type of vehicle and/or location in vehicle). The attachment panel 67 may have fastener hole 64 that correspond to existing seat track bolts and fasteners inside the vehicle 60 using temper resistant fasteners 63. An example of such a unit is the FloorBunker, which is placed on the existing floorboard of a vehicle underneath the driver and fastens to the existing seat track bolts.

As in the previous example, this storage device might incorporate a means of automatically opening the device through the detection of environmental conditions or use of a panic switch, using an actuator and control system such as shown in FIG. 18. For example, the lid 62 might be automatically and quickly opened by depression of a pedal on the floorboard of the vehicle, as shown in FIG. 10.

Figure 12:
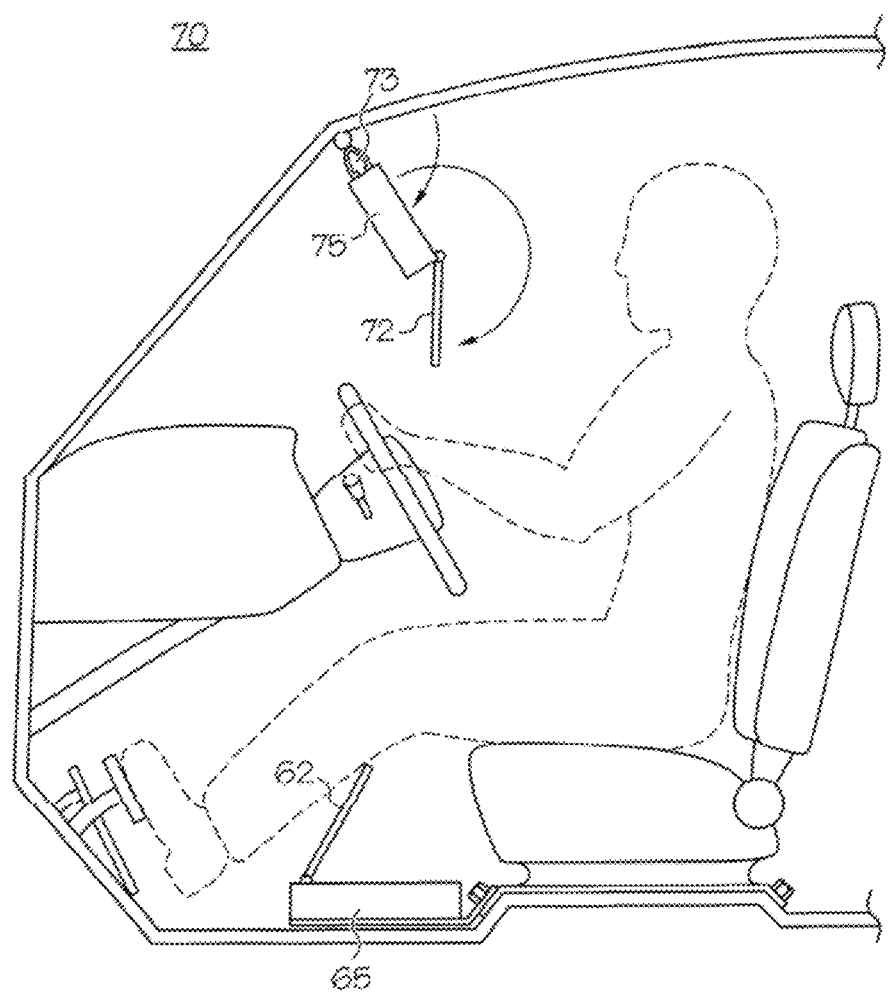
FIG. 12 is a side view of an enclosure of an example embodiment of the secure storage device, with the device located with the device within the visor of a vehicle and the opening ajar.

FIG. 12 shows another possible example embodiment. This embodiment can include four walls, a bottom, and an opening. The secure storage device can be constructed from a variety of materials, including but not limited to aluminum, steel, impact-resistant materials, and bullet-proof materials. In a further example embodiment, the secure storage device 75 may be covered with a bullet-proof material, including but not limited to Kevlar or Lexan or DuPont™ Tensylon®, for example. A further example embodiment comprises racks and compartments located inside the enclosure to hold valuables, including but are not limited to, firearms, jewelry, electronics, money, personal documents, and emergency food rations. A further example embodiment, the secure storage device 75 can include a door or panel 72 that flips out and folds down to allow the door or panel 72 to be used as a shield. The secure storage device 75 can replace or be affixed as a vehicle visor using existing fasteners 73 inside the vehicle 70. Alternatively, the device 75 could be a visor constructed of a bullet-proof material that may automatically deploy using one or more actuators and a control system such as shown in FIG. 18.

Figure 13:
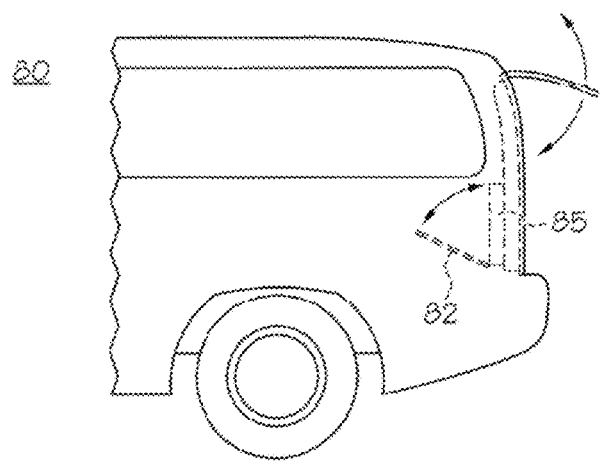
FIG. 13 is a side view of an enclosure of an example embodiment of the secure storage device, with the device located within the tailgate panel of a vehicle and the opening ajar.
Figure 14:
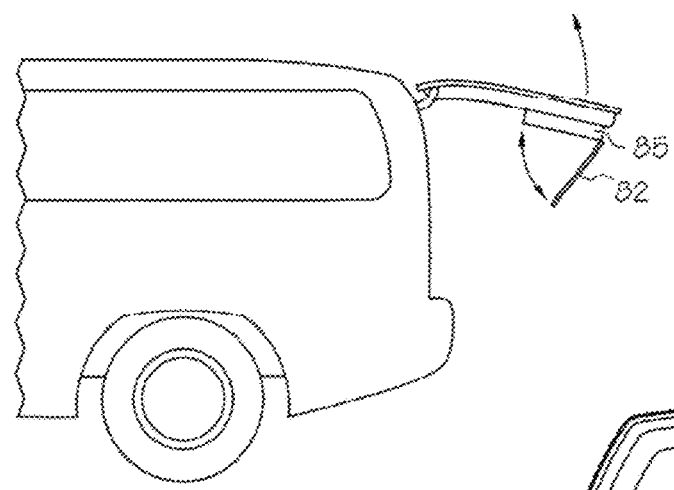
FIG. 14 is a side view of an enclosure of an example embodiment of the secure storage device, with the device located within the tailgate panel of a vehicle and the opening ajar and the tailgate ajar.
Figure 15:
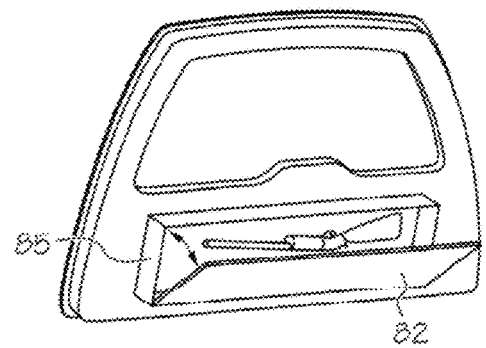
FIG. 15 is a perspective view of an enclosure of an example embodiment of the secure storage device, with the device located within the tailgate panel of a vehicle and the opening ajar.

FIGS. 13-15 show another example embodiment. This embodiment can include four walls, a bottom, and an opening. The secure storage device 85 can be constructed from a variety of materials, including but not limited to aluminum, steel, impact-resistant materials, and bullet-proof materials. In a further example embodiment, the secure storage device may be covered with a bullet-proof material, including but not limited to Kevlar or Lexan or DuPont™ Tensylon®. A further example embodiment comprises racks and compartments located inside the enclosure to hold valuables, including but not limited to, firearms, jewelry, electronics, money, personal documents, and emergency food rations. The secure storage device 85 can be affixed as to the tailgate panel or liftgate or hatch or door of a vehicle 80 using existing fasteners inside the vehicle. In a further example embodiment, the secure storage device 85 can include a door or panel 82 that flips out to allow the user access the interior of the secure storage device 85 either from the interior of the vehicle or while outside the vehicle. In a further example embodiment, a user may access the interior of the secure storage device 85 either when the tailgate of the vehicle 80 is fully ajar or when the glass portion of the tailgate is ajar. A control system such as shown in FIG. 18 could be used to automatically deploy the panel 82 and/or open the door/liftgate/hatch.

In a further embodiment, the secure storage device can retrofitted to fit within the trunk of a vehicle using existing fasteners inside the vehicle that may automatically open the device using one or more actuators and a control system such as shown in FIG. 18. To enable retrofit features, the mounting hardware, such as the attachment panel 67 or other securing components, can be customized for a particular application, whereas the storage device 65 can be of a common design that can be used in many different types of vehicles (e.g., different models of cars, trucks, vans, SUVs, etc.), or placed in different locations in a vehicle (e.g., center console, under seats, on doors or hatches, in trunks, in backseats, in truck beds, etc.).

Figure 16:
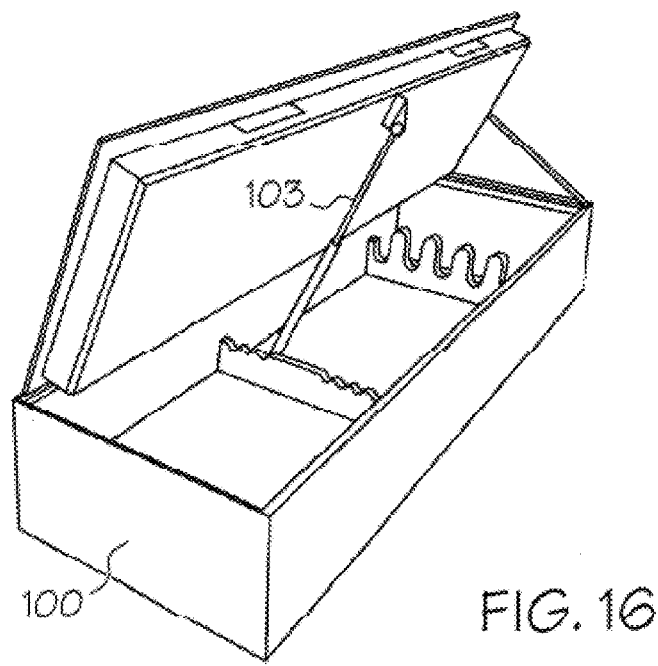
FIG. 16 is a perspective view of enclosure of an example embodiment of an opening mechanism for the secure storage device.
Figure 17:
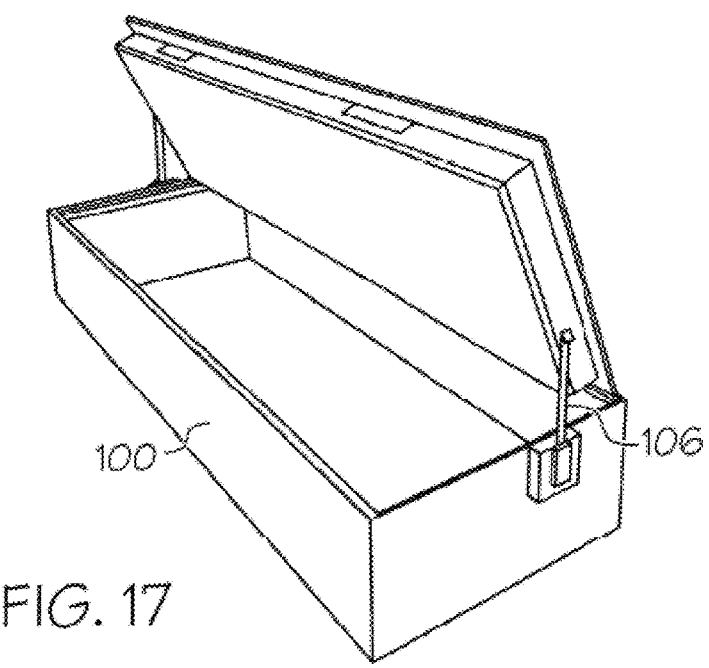
FIG. 17 is a perspective view of enclosure of another exemplary embodiment of an opening mechanism for the secure storage device.

FIGS. 16-17 show another possible example embodiment. This embodiment can include four walls, a bottom, and an opening. The secure storage device 100 may include an opening mechanism 103 or an opening mechanism 106 which includes, but is not limited to such mechanisms as, hydraulic, pneumatic or electrical wired to the locks of a vehicle. The opening mechanism 103 and/or 106 may be activated, by example, but not limited to, biometric recognition, electronic measures, and Bluetooth technology by using the control system of FIG. 18 along with the actuator 204 for automatic and quick deployment.

As discussed above. FIG. 18 shows an example control system that can be used to automatically deploy (e.g., open) any of the storage devices described herein. A panic switch 202 can be provided in any convenient location, such as on a dashboard, floor board, on a key fob, etc. And might be a lever, push button, pedal, etc. This switch could be activated using an application on a cell phone or tablet computer communicating with the controller 201 via Bluetooth, for example. A fob or other remote switch could likewise use wireless communication such as Bluetooth or WiFi.

The sensors 203 could monitor for temperature, sound, or a voice command, for deploying the device. For example, the controller could be programmed to monitor for a gunshot or a collision, for example, and automatically and quickly open the storage device for easy access to the contents. Alternatively, the panic switch can be used for such purposes.

The controller 201 could be any commercially available computer or controller that is programmed to actuate the actuator upon activation of the switch 202 or detection of the desired conditions by the sensors 203. Such a controller will likely include a programmable processor and a memory for storing a program for monitoring the sensor input for activating the storage device upon the happening of the desired condition.

In some circumstances, the controller 201 might be bypassed entirely, such as where the panic switch 202 is directly connected to the actuator 204 for actuation. Power for these components can be supplied by separate battery, or by tapping into a vehicle or household power supply, for example.

It should be evident that this disclosure is by way of example and that various changes may be made by adding, modifying, or eliminating details without departing from the fair scope of the teaching contained in this disclosure. These example embodiments are therefore not limited to particular details of this disclosure except to the extent that the following claims are necessarily so limited.

Figure 19:
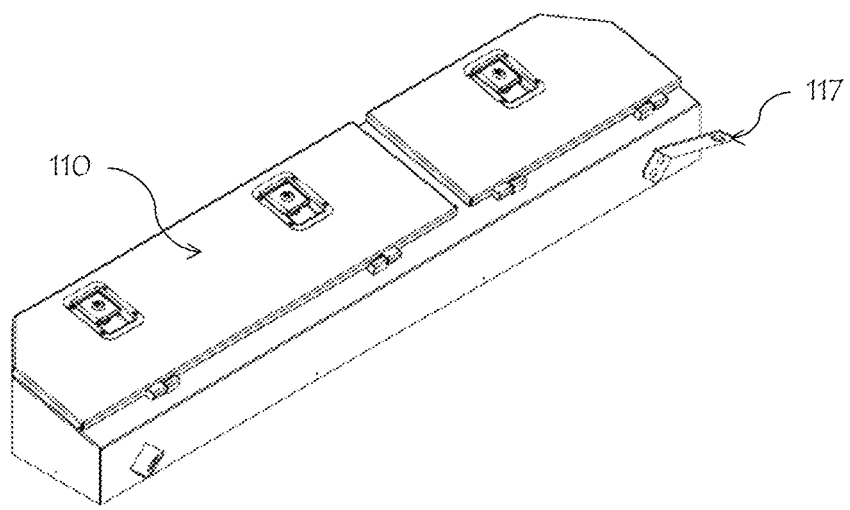
FIG. 19 is a perspective view of an enclosure of an example embodiment of the secure storage device, with modular attachment apparatus.
Figure 20:
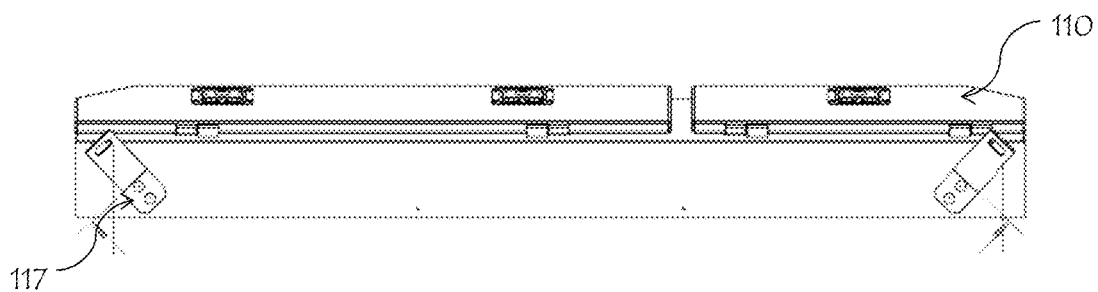
FIG. 20 is a side view of an enclosure of an example embodiment of the secure storage device, with modular attachment apparatus.

FIGS. 19-20 show one example embodiment of such a storage device. The secure storage device 110 can be constructed from a variety of materials, including but not limited to plastic, aluminum, steel, impact-resistant materials, or bullet-proof materials. In a further example embodiment, the secure storage device 110 may be covered with a bullet-proof material, including but not limited to Kevlar. In particular, the use of DuPont™ Tensylon® for the walls of the storage device can provide a bullet-proof feature. A further example embodiment comprises racks and compartments located inside the enclosure to hold valuables, including but are not limited to, firearms, jewelry, electronics, money, personal documents, and emergency food rations. The secure storage device 110 can be placed inside the cab of a truck and fastened by the attachment portion 117 under the seats of the truck using existing bolts and fasteners of inside the cab of the truck. The attachment portion 117 of the storage device 110 may be modular so the same enclosure can be used in different vehicles. In a further example embodiment, the secure storage device 110 may have a quick release mechanism that allows the whole storage device 110 to be removed. In a further example, the quick release may only be accessible with, for example, a lock, combination, bio-metric recognition or the likes for additional security measures. In a further embodiment, the secure storage device 110 may have slots or tracks to place panels for certain desired effects. For example, one compartment may have a panel of fire board, while another compartment has a bullet resistant panel.

Figure 21:
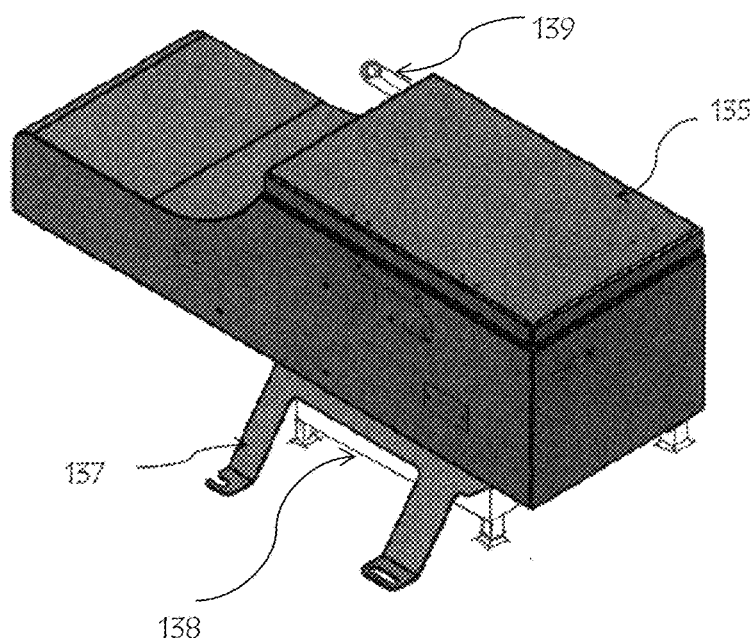
FIG. 21 is a perspective view of the enclosure of an example embodiment of the storage device that may be placed within the console of a vehicle with modular attachment apparatus.
Figure 22:
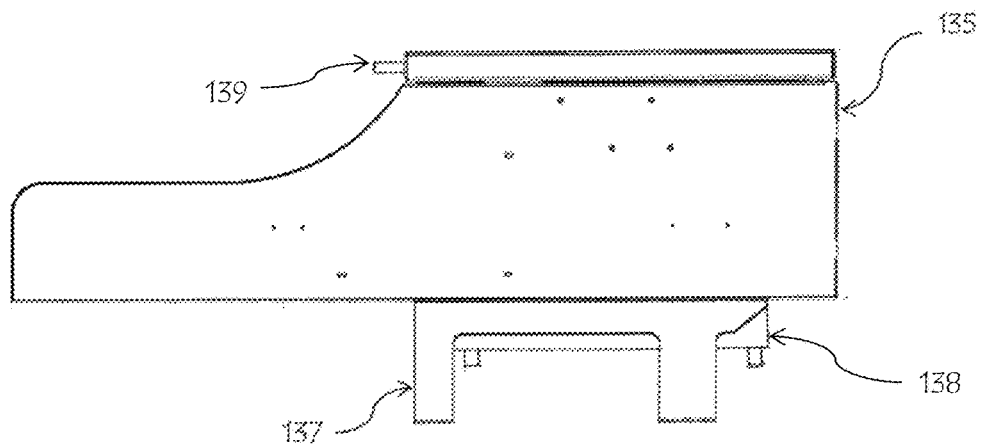
FIG. 22 is a side view of the enclosure of an example embodiment of the storage device that may be placed within the console of a vehicle with modular attachment apparatus.

FIGS. 21-22 show another possible example embodiment. The secure storage device 135 can be constructed from a variety of materials, including but not limited to plastic, aluminum, steel, impact-resistant materials, or bullet-proof materials. In a further example embodiment, the secure storage device 135 may be covered with a bullet-proof material, including but not limited to Kevlar. In particular, the use of DuPont™ Tensylon® for the walls of the storage device can provide a bullet-proof feature. A further example embodiment comprises racks and compartments located inside the enclosure to hold valuables, including but are not limited to, firearms, jewelry, electronics, money, personal documents, and emergency food rations. The secure storage device 135 can replace or be placed within the console of a vehicle and fastened by the attachment portion 137 using existing bolts and fasteners. The attachment portion 137 may be modular so the same storage device 135 can be used in different vehicles. In a further example embodiment, the secure storage device 135 may have a quick release mechanism 138 that is activated by a release mechanism 139, which allows the whole storage device 110 to be removed.

Such a release mechanism could utilize a sliding bolt with matching slot, or latches or other securing mechanisms that are released when the release mechanism 139 is activated. The attachment portion 137 may remain attached to the vehicle, with the storage device being removable for removal from the vehicle, such as to take into a home or mount in another vehicle such as by using another attachment portion 137. Furthermore, the attachment portion can be customized for particular vehicles or vehicle locations, whereas the storage device 135 can be of a common design for use with the different attachment portions.

In a further example, the quick release mechanism 138 may only be accessible with, for example, a lock with key, secret combination, bio-metric recognition or the likes for additional security measures. In an example embodiment, the quick release mechanism 138 may be programmed to the controller 201 that is programmed to actuate the release mechanism 139 upon activation of the switch 202 or detection of the desired conditions by the sensors 203.

Also provided is an example gun visor that can be used to store a firearm in a vehicle. Other weapons can also be accommodated, such as stun guns, tasers, knives, or even flare guns or other devices. An example embodiment of the gun visor can include four walls, a bottom, and an opening covered by a door forming an inner chamber provided with mounting hardware to securely hold the weapon in the interior chamber of the visor. This secure visor can be constructed from a variety of materials, including but not limited to aluminum, steel, impact-resistant materials, and bullet-proof materials. In a further example embodiment, the gun visor may be constructed of, or covered with, a bullet-proof material, including but not limited to Kevlar or Lexan or DuPont™ Tensylon®, for example. A further example embodiment comprises racks and/or compartments located inside the enclosure to hold valuables, including but are not limited to, firearms, jewelry, electronics, money, personal documents, weapons, and emergency food rations. A further example embodiment, the gun visor can include a door or panel that flips out and folds up or down to allow the door or panel to be used as a bullet-proof shield, such as shown in the example of FIG. 12, discussed above. The gun visor can replace or be affixed as a vehicle visor using existing fasteners inside the vehicle, but in particular for an aftermarket gun visor, the device can include additional mounting hardware to accommodate the increased weight of a firearm or other stored items as compared to a traditional visor. Alternatively, the device could be a gun visor constructed of a bullet-proof material that may automatically deployed using one or more actuators and a control system, as also discussed above, to protect the driver or passenger in a threatening situation, such as where gunshots are fired.

FIGS. 23 to 37 show various components and views of an example embodiment having various features of a gun visor system 400 that can be provided to a vehicle, such as an automobile or truck, for storing a weapon such as a pistol 401 or revolver securely in a locked compartment, while also replacing the traditional sun visor function of protecting occupants from the sun in an automobile or other vehicle. This device can be installed in a vehicle by the manufacturer, as a dealer installed accessory, or installed as an after-market product by the owner of the vehicle or another installer. The visor has re-inforced mounting hardware to accommodate the weight of a typical weapon, which may or may not include ammunition and/or replacement magazines as well.

Figure 23:
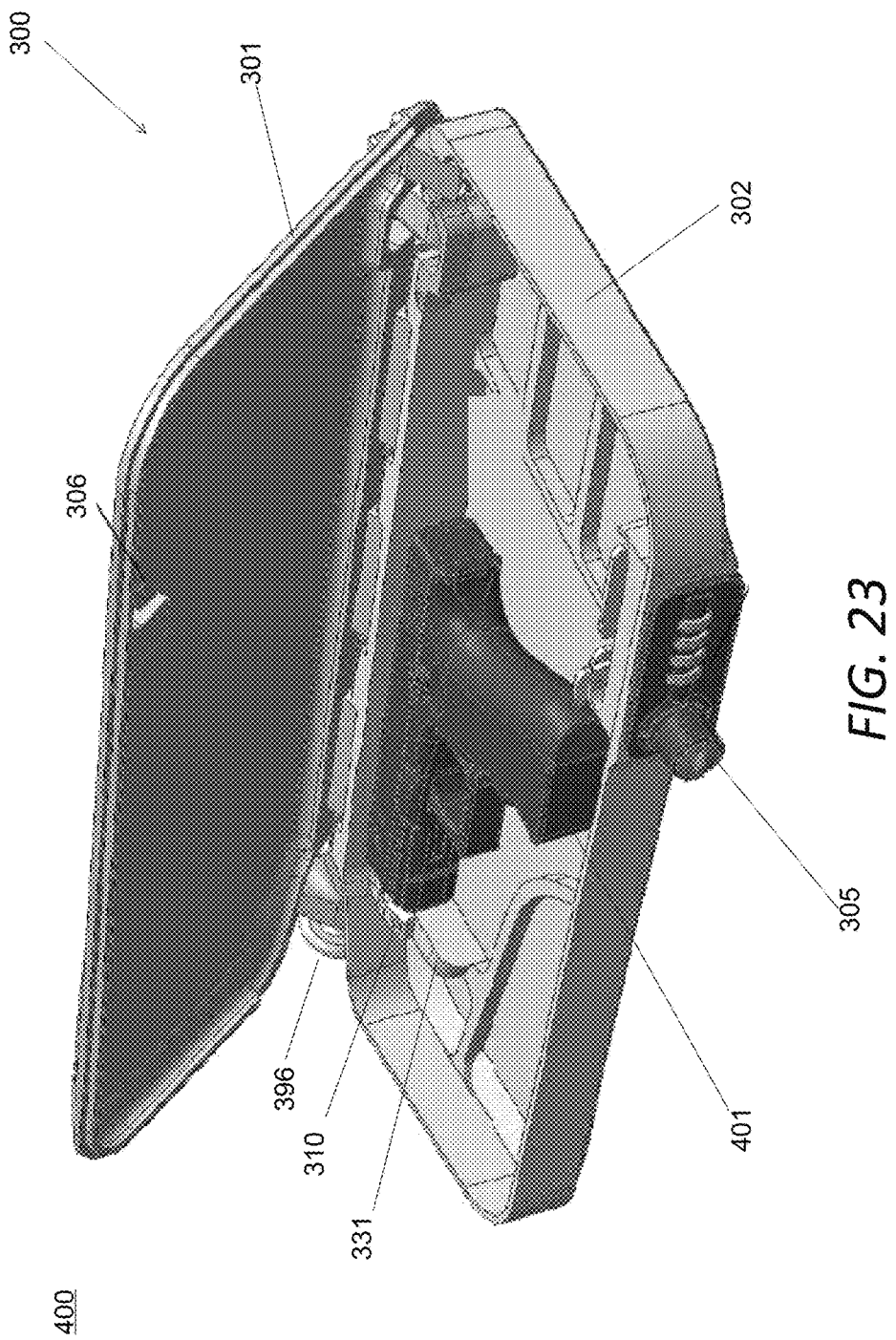
FIG. 23 is a schematic of a perspective view of an example embodiment of a gun visor in a partially open state.
Figure 24:
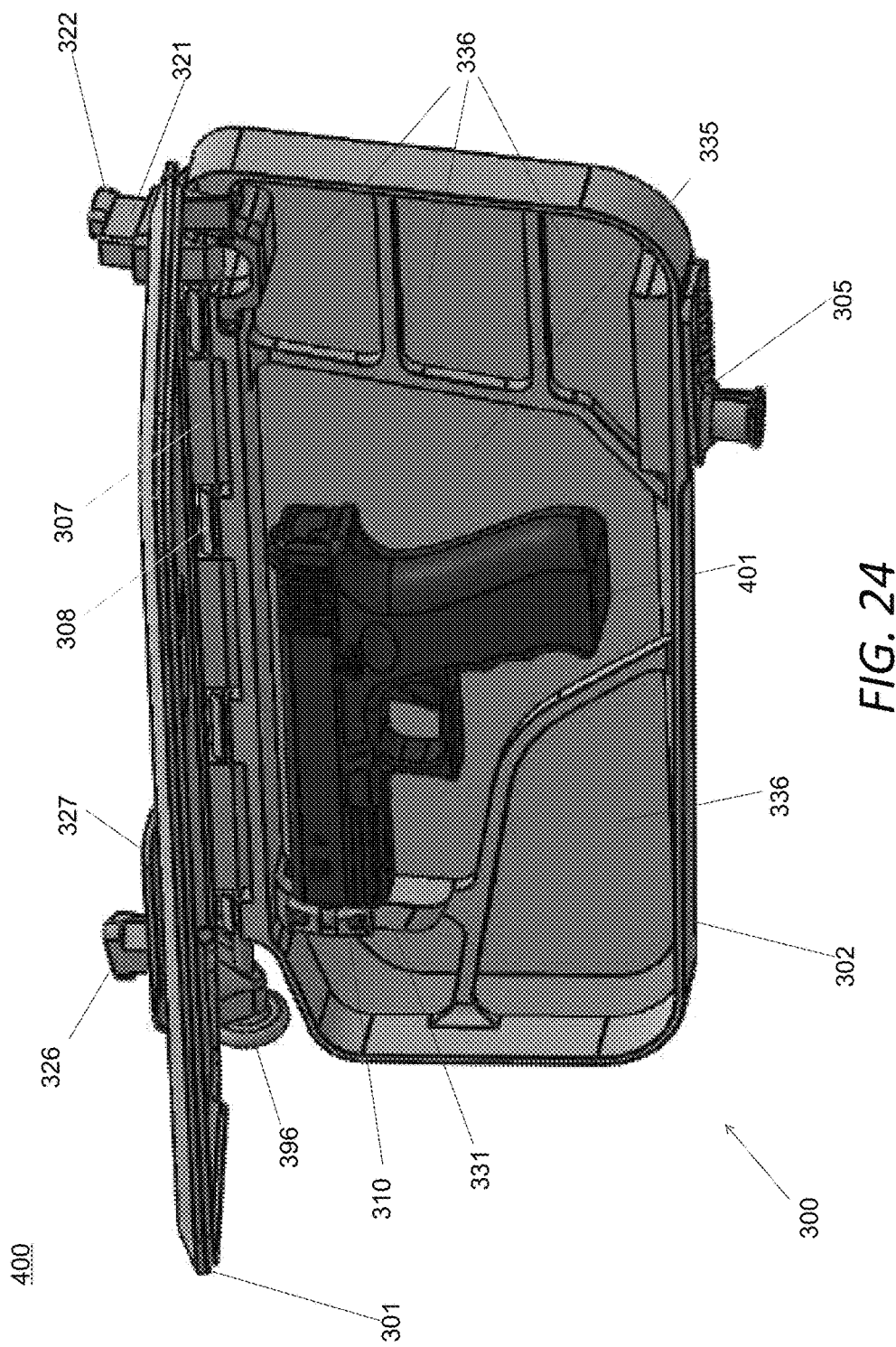
FIG. 24 is a schematic of another perspective view of the example embodiment of the gun visor of FIG. 23 in a mostly open state.

FIGS. 23 and 24 show a schematic of perspective views of an example gun visor system 400 having a gun visor 300 and handgun 401 shown held therein. The gun visor 300 has a visor top 301 (shown mostly open) that acts as a moveable and lockable door to cover a chamber formed by walls of a visor bottom 302. The visor top 301 and visor bottom 302 are connected via hinge hardware 307, 308 (and other components discussed below) to allow movement of the top 301 with respect to the bottom 302, and to allow the visor to rotate on an axis to deploy or stow the visor. The visor has gun securing hardware 310, 330 and a locking and/or latching system 305, 306 (which may be a keyed lock system or a biometric lock system or combination lock system as shown using a locking latch to secure the contents of the visor chamber with the door closed). If desired, the lock could be a biometric lock, such as a fingerprint sensor or voice activated device which may require a battery be installed in the visor 300.

FIG. 24 shows the visor bottom 302 with walls surrounding a perimeter of the visor bottom 302 forming an interior chamber. The visor bottom 302 is provided with a gun platter 306 that can be provided with a magnetic base for securely holding the firearm 401 in place, and the platter 306 may be covered with a material to protect the stored contents, such as a felt or cloth or foam or rubber material, for example. Platter 306 may be extended, or additional platters can be provided in side compartments 336 that can also be magnetic and protectively covered to hold one or more magazines or ammunition for the firearm, for example. Other securing devices, such as Velcro straps, latches, or additional chambers might be provided to secure the firearm 401 and/or magazines or other devices.

Figure 25:
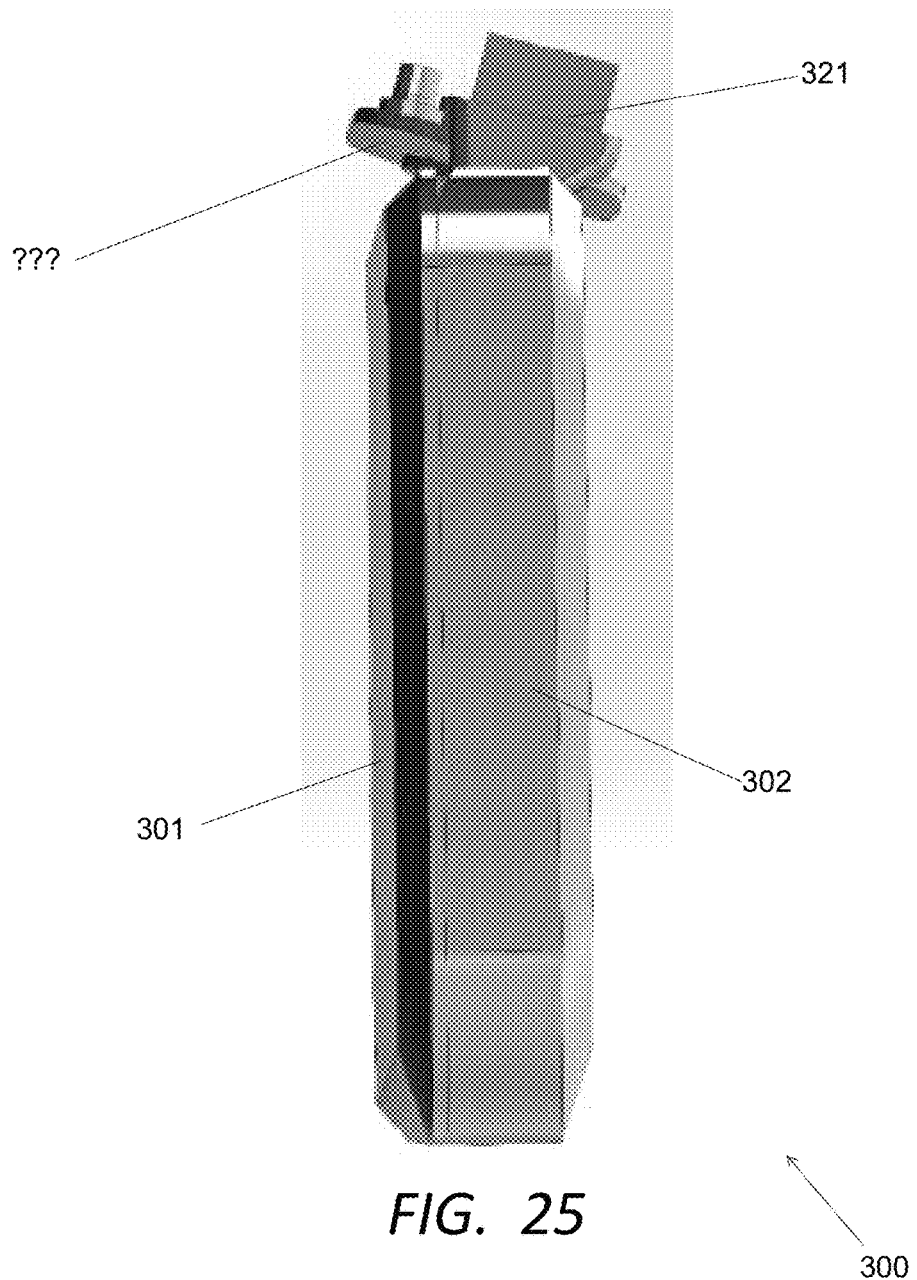
FIG. 25 is a schematic of a side view of the example embodiment of the gun visor of FIG. 23 in a closed state.

FIGS. 23 and 24 also show left mounting hardware 326, 327 and right mounting hardware 321, 322 that are used to securely mount the visor to a roof of the vehicle. FIG. 25 shows a side view of the example gun visor with visor top 301, visor bottom 302 with contents held therein.

Figure 26:
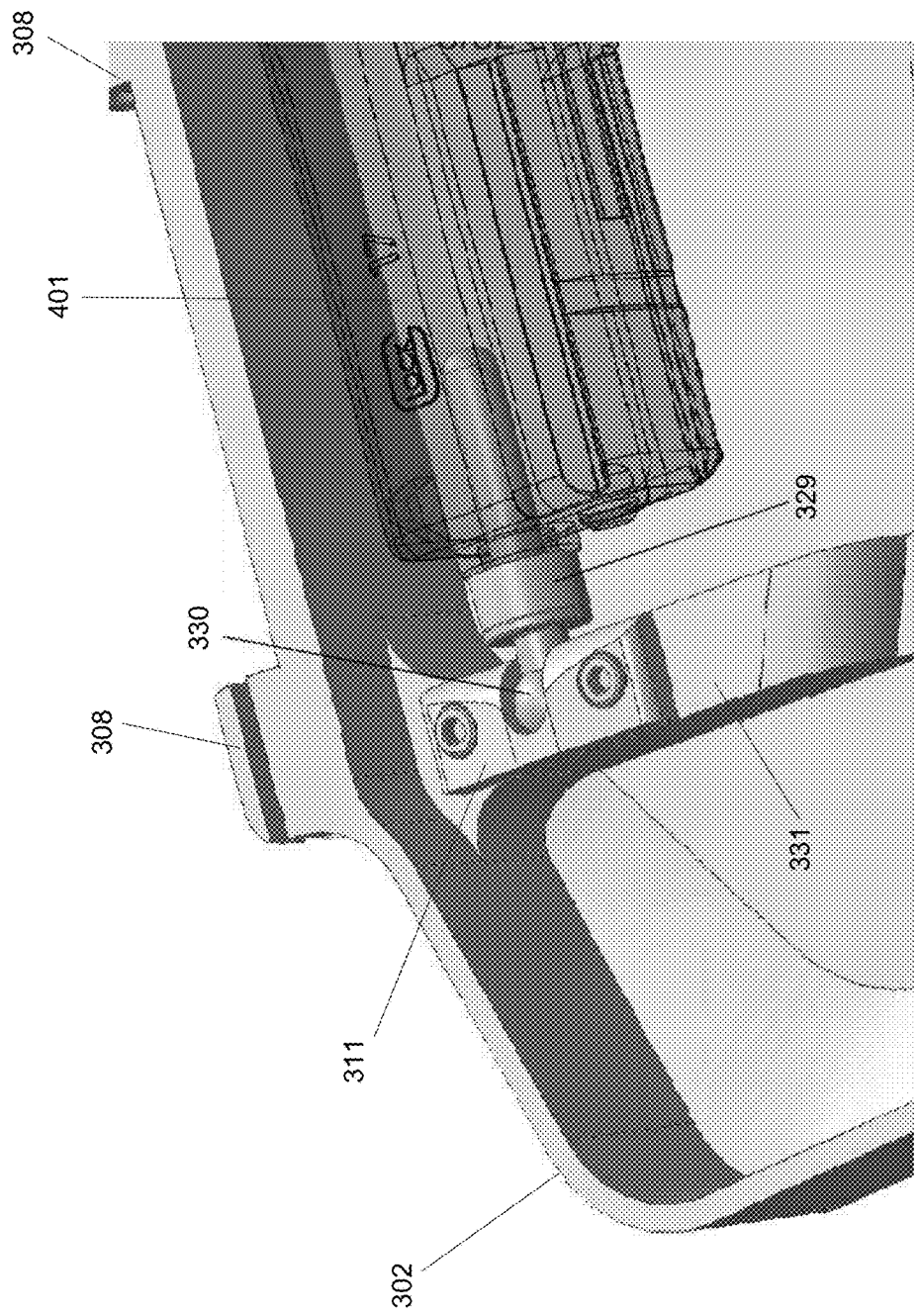
FIG. 26 is a schematic of a partial view of the example embodiment of the gun visor of FIG. 23 showing a closeup of example gun mounting hardware.

FIG. 26 provides a schematic of a close-up of the visor bottom 302. The gun is held in place using gun securing hardware including a ridge 331 formed in the visor bottom 302 with securing hardware 310 including a swivel rod 330 mounted in the swivel cap 311 that is mounted on the ridge 331 using a pair of fasteners (such as screws) as shown. The swivel cap 311 allows the swivel road 330 to swivel outwardly and inwardly to allow for secure mounting and easy dismounting the firearm from the gun visor inner chamber. A grommet or magnetic catch 329 can optionally be provided based on the size of the firearm to better secure the gun using the securing hardware. The magnetic catch 329 can accommodate the size of the firearm, and use magnetism to help hold the firearm in place to supplement the magnetic gun platter 335. Additional magnetic components, straps, and/or latches can be provided at other locations to further secure the firearm, if desired. Additionally, as discussed above, entire portions of the interior bottom of the visor bottom can be constructed of a single magnetic platter or a plurality of magnetic portions to aid in securely holding the firearm. Appropriate magnetic materials include a magnetized metal (steel or iron or nickel) or composites or alloy material, such as cobalt, or neodymium or other rare earth magnets.

Figure 27:
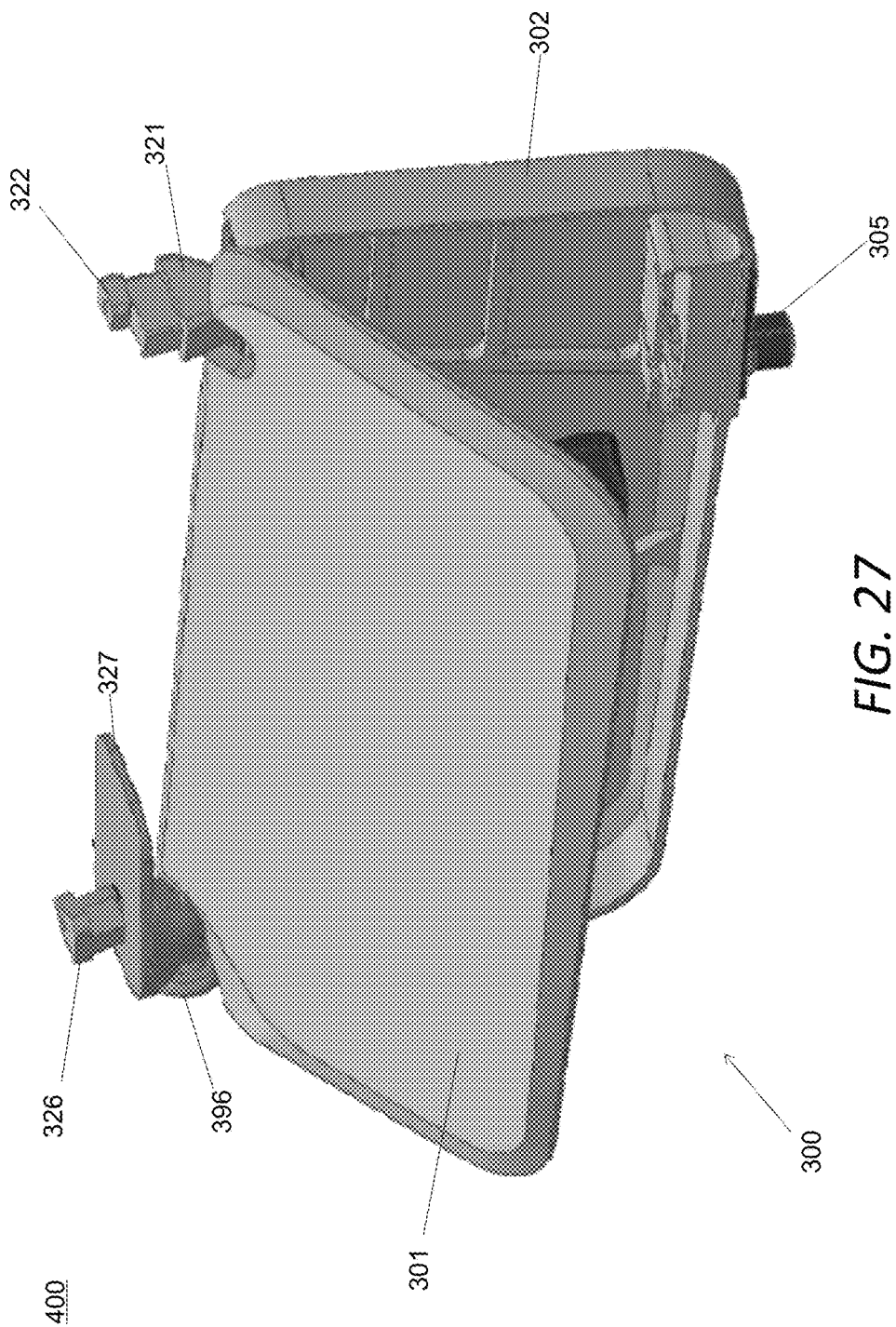
FIG. 27 is a schematic of another perspective view of the top of the example embodiment of the gun visor of FIG. 23 in a partly open state and showing mounting hardware.

FIG. 27 shows a schematic of the example gun visor 300 with a partly open visor top 301 acting as a door shown partially exposing the chamber of the visor bottom 302. Right mounting hardware is provided including a right roof anchor 322 connected to a right roof mount 321. Left mounting hardware is provided including left roof anchor 326 connected to left roof mount 327. The components of the roof mount are discussed in more detail hereinbelow.

Figure 28:
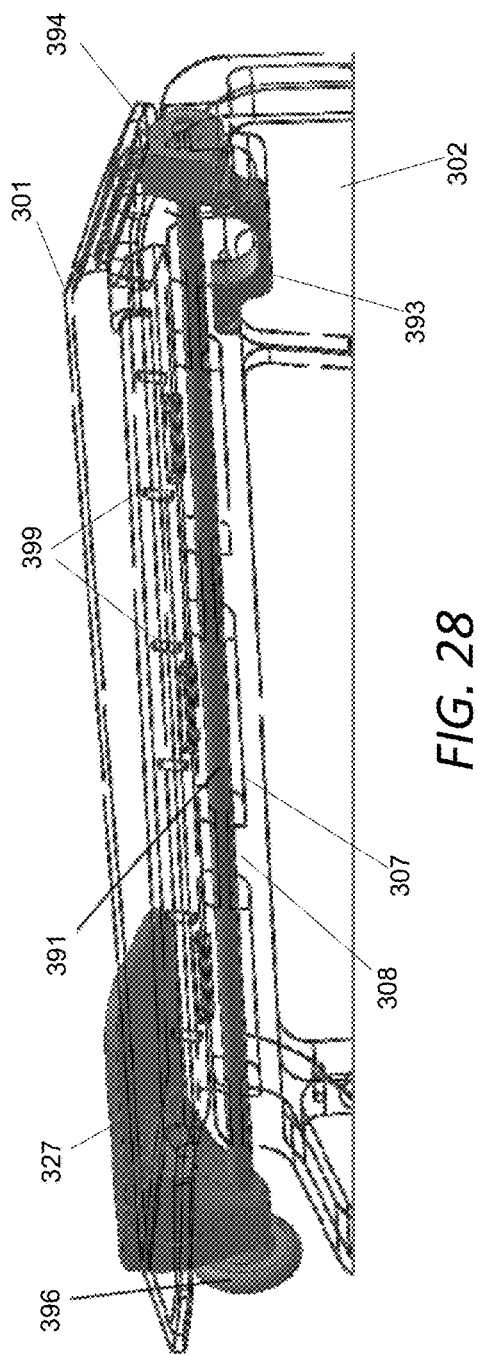
FIG. 28 is a schematic drawing having see-through portions of the example embodiment of the gun visor of FIG. 23 in a partly showing example hinge hardware.

FIG. 28 shows a partial view of the example gun visor with some parts shown transparent in order to show the position locking hinge components and assembly of the visor, which include a hinge rod 391 that is provided through three hinge inserts 307 mounted on the top visor mount 301 using fasteners 399 (such as screws). The bottom visor 302 has hinge flanges 308 through which the hinge rod 391 also passes, connecting the visor top 301 to the visor bottom 302 is a movable manner allowing the visor top 301 to cover and uncover the chamber of the visor bottom 302 as a secure door. Spacer washers or grommets might be provided between the hinge flanges 308 and the hinge inserts 307 to ease movement and/or for easier assembly. A spring device or other component could be provided to automatically open, and help hold open, the visor top 301 to more easily retrieve the weapon when the gun visor is unlocked and unlatched. For example, a rotational spring might be included in this mechanism on the hinge rod 391 in place of one or more of the spacers/grommets to automatically open the door (visor top 301) when unlocked/unlatched through a rotational torque of the spring.

Figure 29:
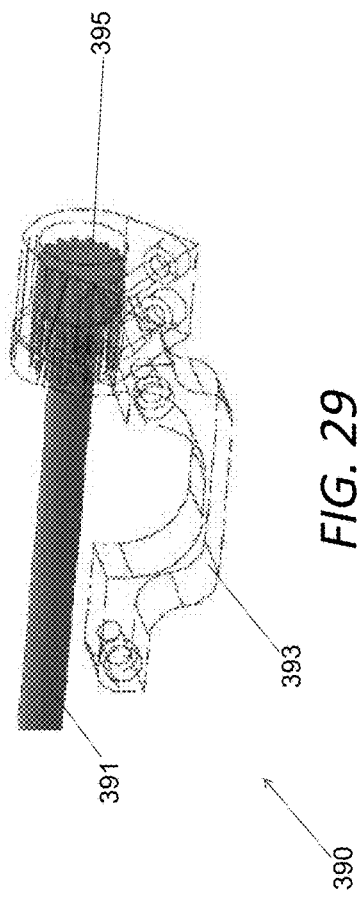
FIG. 29 is a schematic of a locking portion of the hinge hardware of FIG. 28.

A push knob 396 is provided at one end of the hinge rod 391, with a locking portion 390 (as shown in FIG. 29) provided at the other end. The locking portion 390 includes a locking gear 395 mounted at the end of the hinge rod 391, inserted in a bottom insert 393 having a gearing portion corresponding to the gearing of the locking gear 395.

The push knob 396 allows a user to pull the hinge rod 391, allowing the visor to rotate to a desired location (setting the visor to a desired angle of rotation), whereby the push knob 396 is then pushed in to lock (i.e., hold) the visor in the desired position through the action of locking gear 395 interacting with the gearing portions of the bottom insert 393 and top mount 394. This allows the visor to be held in place in a desired position to block the sun for the driver or passenger (depending on which side of the vehicle the visor is mounted. This feature is provided to accommodate the added weight of the gun visor holding a weapon and magazine(s), as compared to a traditional visor.

As an alternative to the use of gears, friction devices (e.g. through the use of bushings) can be used to lock (i.e., hold) the visor in place at the desired angle of rotation. The amount of friction supplied by the friction devices can be made adjustable to increase or decrease the amount of friction. Alternatively, a ball/detent mechanism may be used. These embodiments may not need any manually operated push rod, as the frictional resistance may be used to hold the visor at a desired angle without the use of any release mechanism.

With the addition of one or more springs or another deployment mechanism (not shown) used to provide a force to separate the visor top from the visor bottom, the gun visor 300 can be designed to operate as a clamshell. When the gun visor 300 is up along the roof of the vehicle in the stowed position, when the lock or latch is released, the gun visor bottom 302 will drop down while the visor top 301 will remain up to expose the contents inside. If the gun visor is at a downward angle away from stowage, i.e., in a partial or full sun blocking position, when the lock is released then the visor top 301 will rise upward to expose the contents inside. Intermediate locations may mean that both the top and the bottom are moved away from each other in some embodiments.

Figure 30:
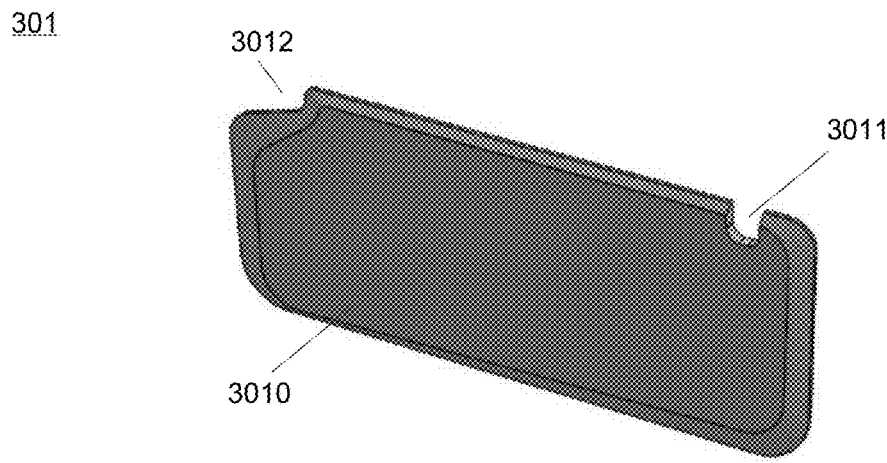
FIG. 30 is a schematic of an example top part of the gun visor of FIG. 23.

FIG. 30 shows a schematic view of an example visor top 301 having a slot 3011 for accommodating the right mounting hardware and a cut-away 3012 for accommodating the left mounting hardware. The hinge insert 307 of FIG. 36 would be installed on this visor top to form a hinge with the visor bottom hinge flanges 308 (see FIG. 26) through use of the hinge rod 391. Both the visor top 301 and the visor bottom 302 can be constructed of a variety of materials, from metals, to plastics to composite materials. Since strength is desirable to securely hold the handgun and/or other weapons, which may be of considerable weight, one desirable material would be a strong aluminum alloy for both strength and lightweight properties. Of course, other materials can also be strong, such as steel (e.g., stainless or chromed), or a strong composite material. The outer portions of the visor may be covered with a laminated cloth, plastic, or paint for decorative purposes. The inner portion of the visor top 301 might be covered in a felt or other soft material to protect the firearm, for example.

Figure 31:
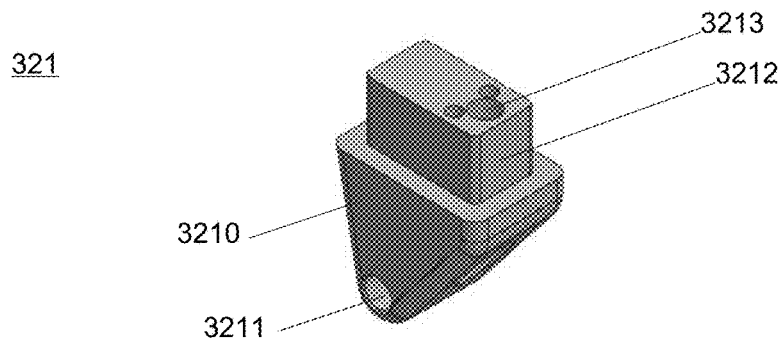
FIG. 31 is a schematic of an example right roof mount of the gun visor of FIG. 23.
Figure 39:
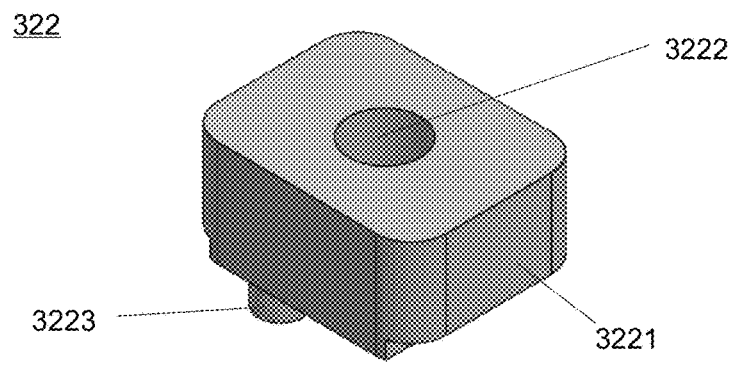
FIG. 39 is a schematic of an example right roof anchor for the example gun visor.

FIG. 31 shows an example view of a right roof mount, with base 3212 having a hole 3216 for mounting to a rod 3223 of right roof anchor 322, as shown in FIG. 39. A hinge portion 3210 is provided with hole 3211 to accommodate the hinge rod 391 to secure the right side of the gun visor to the vehicle in a movable manner to enable opening of the visor top 301 and rotation of the gun visor 300.

Figure 32:
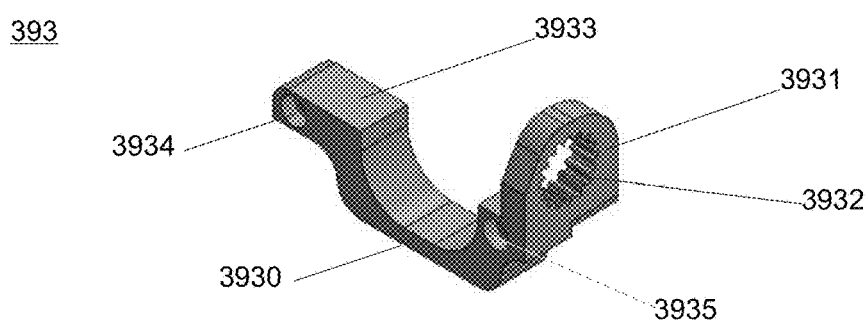
FIG. 32 is a schematic of an example bottom insert of the hinge hardware of FIG. 28.

FIG. 32 shows a schematic view of an example bottom insert 393, having a base 3930, and a projection 3932 having gearing portion 3931 to accommodate locking gear 395 to lock the visor in a desired location. Holes 3934 and 3935 are used to secure the bottom insert 393 to the visor bottom 302 using screws or other fasteners.

Figure 33:
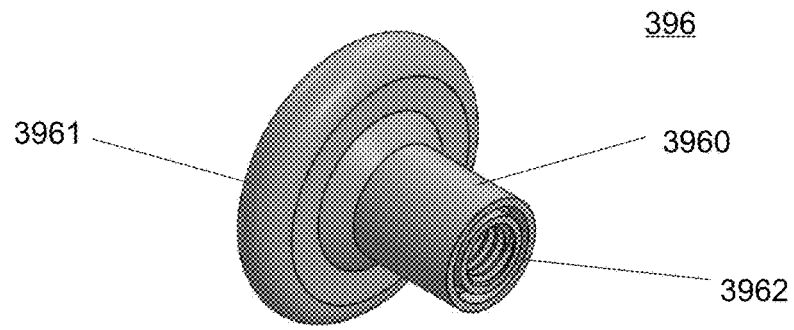
FIG. 33 is a schematic of an example push nob of the hinge hardware of FIG. 28.

FIG. 33 shows a schematic view of an example push knob 396, which as a hand portion 3961 configured for manually operating the visor hinge, and a projection 3960 having female threads 3962 to mount on associated male threads provided on an end of the hinge rod 391 (not shown) for installing the push knob 396 on the hinge rod 391.

Figure 34:
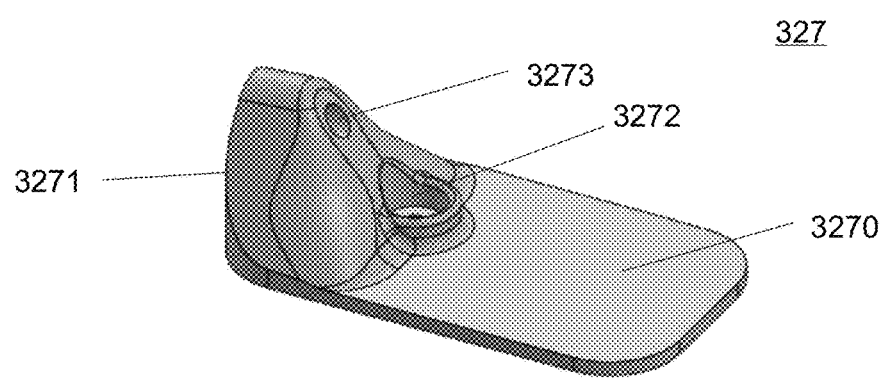
FIG. 34 is a schematic of an example roof mount for the example gun visor.
Figure 35:
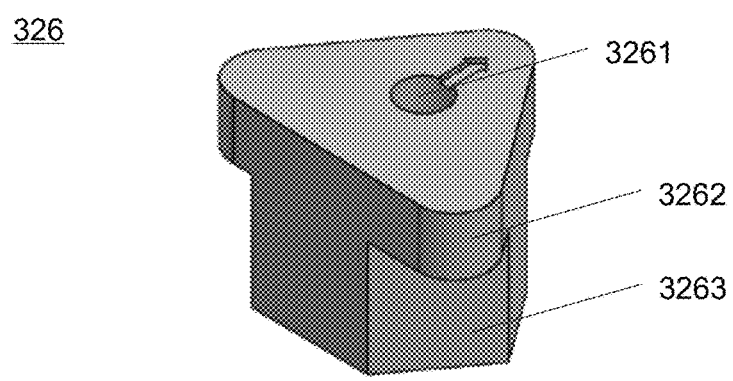
FIG. 35 is a schematic of an example roof anchor for the example gun visor.

FIG. 34 shows a schematic view of an example left roof mount 327 that has a base 3270 and a hole 3272 for attaching the left side of the visor to the left roof anchor 326 (see FIG. 35). Hole 3273 is provided in projection 3271 to accommodate the hinge rod 391 to help enable rotation of the visor about the hinge rod 391.

FIG. 35 shows a schematic view of an example left roof anchor with a base 3262 with hole 3261 for connecting to the roof of the vehicle using a fastener, and a projection 3263 for connecting to the left roof mount 327.

Figure 36:
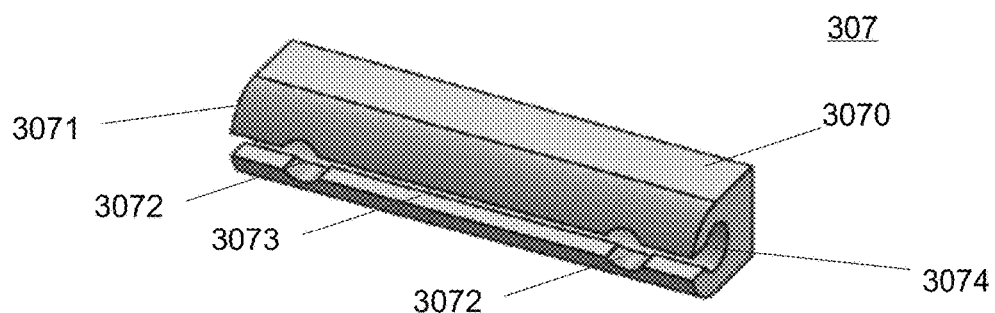
FIG. 36 is a schematic of an example hinge insert for the example gun visor.

FIG. 36 shows a schematic view of an example hinge insert 307 having a body 3070 with a curved portion 3071 and a slot 3073 and a hole 3074 to accommodate the hinge rod 391. Holes 3072 are provided to access holes on the bottom of the body 3070 for use in connecting the hinge insert 307 to the visor top 301 using fasteners 399 (such as screws, see FIG. 28).

Figure 37:
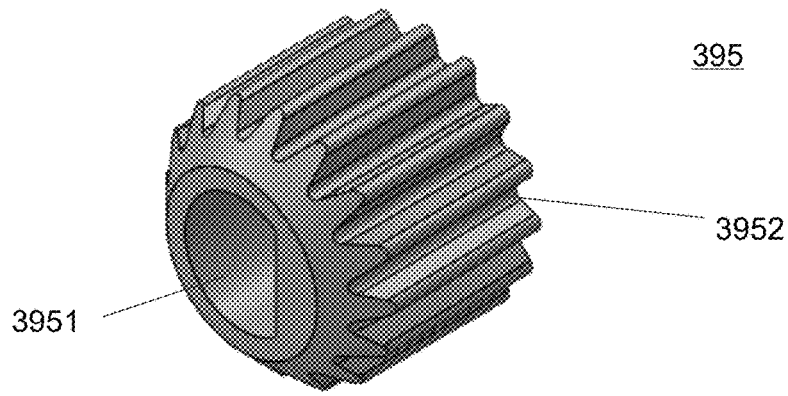
FIG. 37 is a schematic of an example locking gear for the hinge hardware of FIG. 28.

FIG. 37 shows a schematic view of an example locking gear 395 having a keyed hole 3951 that would be installed on an end of the hinge rod 391 that would have a matching keyed end.

Figure 38:
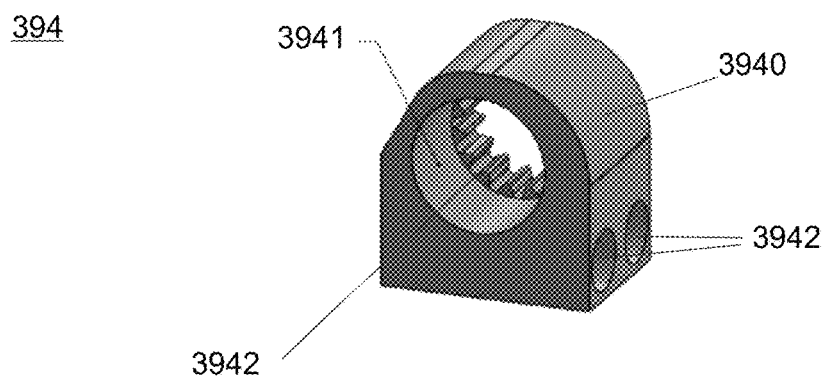
FIG. 38 is a schematic of an example top mount for the hinge hardware of FIG. 28.

FIG. 38 shows a schematic view of an example of a top mount 394 having a hole 3941 with a smooth portion and a geared portion 3942 to accommodate the locking gear 395. The locking gear will engage and disengage the geared portion 3942 to allow for the gun visor to be fixed in place, and moved, respectively, as discussed above. Holes 3942 are provided in the top mount 394 for securing the top mount to the visor top 301 using fasteners such as screws.

FIG. 39 shows a schematic view of an example right roof anchor 322 with body 3221, rod 3223 for engaging the hole 3213 of right roof mount 321 (see FIG. 31), and a hole 3222 for accepting a fastener (such as a screw) for fastening the right roof anchor 322 to the roof of the vehicle.

In most vehicles, one or both of the roof anchors 322, 326 can use mounting structures in the vehicle roof that are provided for the original sun visor, with these anchors providing additional strength over the original visor components. For example, left anchor 326 can connect to the roof hardware and/or screw holes used for parking structure where the original visor is parked, whereas right anchor 322 can connect to the original hardware used for permanently mounting the visor to the roof. In unusual cases, new mounting holes and hardware may need to be providing for mounting to the vehicle roof, and/or on a frame. The anchors 222, 326 can be modified as needed to adapt to desired vehicle visor designs.

Figure 40:
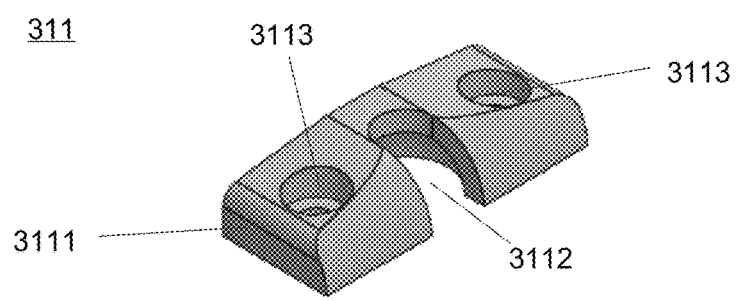
FIG. 40 is a schematic of an example swivel cap for the example gun visor.

FIG. 40 shows a schematic view of an example swivel cap 311 having a base 3111, a slot 3112 for receiving the ball 3301 of the swivel rod 330 (see FIG. 41), and a pair of holes 3113 for mounting the swivel cap 311 on the ridge 331 of the visor bottom 301 using fasteners such as screws.

Figure 41:
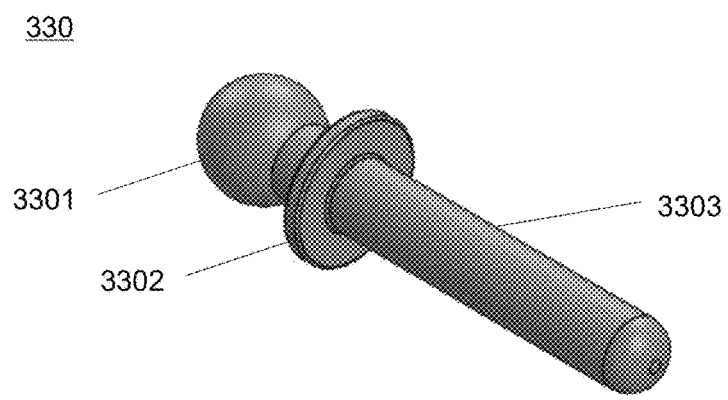
FIG. 41 is a schematic of an example swivel rod for the example gun visor.

FIG. 41 shows a schematic view of an example swivel rod 330 having a ball 3301 for accommodating the slot 3112 of the swivel cap 311 (see FIG. 40), ridge 3302, and rod extension 3303 for inserting in the barrel of a firearm (such as a piston or revolver). The swivel rod might be magnetized to help hold the gun in place, and it might be covered with a protective material to protect the gun barrel. The ball 3301 is held securely in the gun visor by the slot 3112 of the swivel cap, but also allows the swivel rod 330 to swivel outwardly to accommodate inserting and removing the gun into the gun visor. For other types of weapons (e.g. knives, tasers etc.), a strap or latch may be substituted for the swivel rod and swivel cap to hold the weapon in place. Alternatively, these devices might be held in place by the magnets.

Any of the components shown in FIGS. 31 to 41 could be made of a relatively hard and durable materials, such as a metal alloy (aluminum, steel, etc.) or a strong plastic or composite. In particular, the geared components should be made sufficiently durable to prevent damage to the teeth of the gearing. Where friction components are used in place of the gearing, rubber or plastic parts might be used, or textured metals. Any of the components might be painted or otherwise covered with decorative materials, if desired.

Note that the example embodiment of the visor is described for use on the passenger side of the vehicle, but that a visor could be designed for use on the driver's side of the vehicle, such as by transposing the left and right mounting hardware to accommodate the driver side visor location.

The present disclosure has been described with reference to the example embodiments described above. Modifications and alterations will occur to others upon a reading and understanding of this specification. Example embodiments incorporating one or more aspects of the invention are intended to include all such modifications and alterations.

What is claimed is:

1. A visor for a vehicle comprising:
an enclosure defined by walls, a bottom, and a door configured to open and close to access an interior chamber;
an attachment mechanism configured to install the enclosure in a vehicle at one end of the enclosure; and
weapon mounting hardware configured to secure a weapon in the interior chamber; wherein
said attachment mechanism is adapted to allow rotation of said enclosure about an axis at the one end of the enclosure to expose and partially block a window of the vehicle wherein
said door rotates about a door axis at the one end of the enclosure.

2. The visor according to claim 1, further comprising a locking mechanism utilizing gearing or friction configured to hold the enclosure at a desired angular position.

3. The visor according to claim 2, wherein said visor is configured to automatically open the door when the visor is unlocked or unlatched.

4. The visor according to claim 3, wherein said locking mechanism is configured to be manually activated for holding the angular position and wherein the door is automatically opened no matter what angular position the visor is set to.

5. The visor according to claim 2, wherein said locking mechanism is configured to be manually activated for holding the angular position and manually released to move the enclosure to a different angular position.

6. The visor according to claim 1, wherein said weapon mounting hardware is configured to use a magnetic field to secure the weapon in the interior chamber.

7. A visor for a vehicle comprising:
an enclosure defined by walls, a bottom, and a door configured to open and close to access an interior chamber;
an attachment mechanism configured to install the enclosure in a vehicle; and
weapon mounting hardware configured to secure a weapon in the interior chamber; wherein
said attachment mechanism is adapted to allow rotation of said enclosure about an axis to expose and partially block a window of the vehicle, wherein said weapon mounting hardware includes a rod that can swivel about one end configured for securing the weapon in the interior chamber.

8. The visor according to claim 7, wherein at least a portion of said rod is configured to enter a barrel of the weapon.

9. The visor according to claim 1, wherein the attachment mechanism includes two separate connection points configured to connect to a roof of the vehicle.

10. The visor according to claim 9, wherein each connection point includes hardware that is permanently attached to the visor and permits the visor to rotate on an axis.

11. The visor according to claim 1 including the weapon provided in the inner chamber secured by the weapon mounting hardware.

12. The visor according to claim 1, wherein the enclosure includes a bullet-proof material.

13. The visor according to claim 1, further comprising a locking mechanism configured to prevent unauthorized access to the enclosure.

14. A visor for a vehicle comprising:
an enclosure defined by walls, a bottom, and a door configured to open and close to access an interior chamber;
an attachment mechanism configured to connect the enclosure to a roof of a vehicle at two different points both at one end of the enclosure; and
weapon mounting hardware configured to secure a weapon in the interior chamber; wherein
said attachment mechanism is adapted to allow rotation of said enclosure about an axis at the one end of the enclosure to expose and partially block a window of the vehicle, said attachment mechanism configured to be manually operated to lock the enclosure at a desired angular position and to release the enclosure for moving the enclosure to a different angular position at which it can be locked by the attachment mechanism, wherein said door rotates about a door axis at the one end of the enclosure.

15. The visor according to claim 14, wherein said visor is configured to automatically open the door when the visor is unlocked or unlatched.

16. The visor according to claim 14, wherein said weapon mounting hardware is configured to use a magnetic field to secure the weapon in the interior chamber.

17. The visor according to claim 14, wherein said weapon mounting hardware includes a rod that can swivel to secure the weapon in the interior chamber.

18. The visor according to claim 17, wherein at least a portion of said rod is configured to enter a barrel of the weapon.

19. The visor according to claim 14 including the weapon provided in the inner chamber secured by the weapon mounting hardware.

20. The visor according to claim 14, wherein the enclosure includes a bullet-proof material.

21. The visor according to claim 14, further comprising a locking mechanism configured to prevent unauthorized access to the enclosure.

22. A visor for a vehicle comprising:
   an enclosure defined by walls, a bottom, and a door configured to open and close to access an interior chamber;
   an attachment mechanism configured to connect the enclosure to a roof of a vehicle at two different points both at one end of the enclosure, wherein said visor is configured to rotate about a common axis at the one end of the enclosure through hardware at each of said different points;
   weapon mounting hardware configured to secure a weapon in the interior chamber using a magnetic field;
   a locking mechanism configured to prevent unauthorized access to the enclosure, wherein
   said attachment mechanism is adapted to allow rotation of said enclosure about said axis to expose and partially block a window of the vehicle, said attachment mechanism configured to be manually operated to lock the enclosure at a desired angular position and to release the enclosure for moving the enclosure to a different angular position at which it can also be locked by the attachment mechanism, and further wherein
   said door rotates about a door axis at the one end of the enclosure.

23. A method of installing a visor for a vehicle comprising the steps of:
   providing an after-market visor for a vehicle, said visor comprising:
      an enclosure defined by walls, a bottom, and a door configured to open and close to access an interior chamber,
      an attachment mechanism configured to install the enclosure in a vehicle, and
      weapon mounting hardware configured to secure a weapon in the interior chamber, wherein
      said attachment mechanism is adapted to allow rotation of said enclosure about an axis to expose and partially block a window of the vehicle and to lock the enclosure at a desired angle of rotation;
   removing an original visor from the vehicle;
   securing a first roof anchor to a roof of the vehicle at a first location;
   securing a second roof anchor to the roof of the vehicle at a second point;
   connecting a first part of the attachment mechanism to said first roof anchor; and
   connecting a second part of the attachment mechanism to said second roof anchor.

* * * * *